United States Patent [19]
Wilson et al.

[11] Patent Number: 5,976,005
[45] Date of Patent: Nov. 2, 1999

[54] APPARATUS FOR STEAM PASTEURIZATION OF MEAT

[75] Inventors: Robert C. Wilson, Redmond; John Strong, Kirkland; Jon Hocker, Bothell; Jerry O'Connor, Issaquah, all of Wash.; Jerome D. Leising, Shorewood, Minn.

[73] Assignee: Frigoscandia Equipment Inc., Redmond, Wash.

[21] Appl. No.: 09/014,358

[22] Filed: Jan. 23, 1998

Related U.S. Application Data

[60] Division of application No. 08/553,852, Nov. 6, 1995, which is a continuation-in-part of application No. 08/335,437, Nov. 7, 1994.

[51] Int. Cl.⁶ .................................................. A22B 5/08
[52] U.S. Cl. .............................. 452/173; 452/74; 452/77
[58] Field of Search ............................. 452/173, 71, 74, 452/76, 77

[56] References Cited

U.S. PATENT DOCUMENTS

| | | |
|---|---|---|
| 603,082 | 4/1898 | Henkel et al. |
| 1,146,589 | 7/1915 | Morrison. |
| 1,848,596 | 3/1932 | Allbright. |
| 1,850,031 | 3/1932 | Rayson. |
| 2,060,423 | 11/1936 | McKee et al.. |
| 2,631,520 | 3/1953 | Geerling. |
| 2,978,738 | 4/1961 | Jonsson. |
| 3,135,016 | 6/1964 | Ekstam et al.. |

(List continued on next page.)

FOREIGN PATENT DOCUMENTS

| | | |
|---|---|---|
| 1486467 | 6/1967 | France. |
| 2497072 | 7/1982 | France. |
| 2603775 | 3/1988 | France. |
| 2663509 | 12/1991 | France. |
| 23666 | 1/1916 | United Kingdom. |
| 338768 | 12/1929 | United Kingdom. |
| 954391 | 4/1964 | United Kingdom. |
| 1072430 | 6/1967 | United Kingdom. |
| 1199557 | 7/1970 | United Kingdom. |
| 1562590 | 3/1980 | United Kingdom. |
| 2182461 | 5/1987 | United Kingdom. |
| 2240912 | 8/1991 | United Kingdom. |

OTHER PUBLICATIONS

United States Department of Agriculture, Letter dated Dec. 5, 1995.
Newspaper article on beef pasteurization, publication unknown, date unknown.

*Primary Examiner*—Willis Little
*Attorney, Agent, or Firm*—Christensen O'Connor Johnson & Kindness PLLC

[57] ABSTRACT

An apparatus for destroying pathogens on meat includes a dewatering station, a steam heating chamber, and a cooling chamber. The meat is treated as it is moved along by a conveyor. The dewatering chamber includes an air blower with nozzles for blowing air at the surface of the meat to remove surface water from the meat. The steam heating chamber is disposed adjacent the dewatering chamber and includes a steam heating chamber enclosure that is sealed for maintaining a positive pressure in the steam heating chamber relative to the dewatering chamber. In one embodiment the steam chamber moves along with the meat on the conveyor. The cooling chamber is disposed adjacent the steam chamber opposite from the dewatering station. The cooling chamber has nozzles for spraying chilled water onto the surface of the meat for rapidly cooling the meat after it is passed through the steam heating chamber. The meat conveyor extends through the dewatering chamber, the steam chamber, and the chilled water chamber. The meat conveyor supports the meat and transfers it from chamber to chamber. A method for destroying pathogens on meat is also disclosed that includes the steps of removing surface water from the meat, passing the meat through a steam chamber having a positive pressure relative to the outside of the steam chamber, and rapidly chilling the surface of the meat.

43 Claims, 12 Drawing Sheets

5,976,005
Page 2

U.S. PATENT DOCUMENTS

| | | | |
|---|---|---|---|
| 3,522,058 | 7/1970 | Libby | 452/74 |
| 3,631,563 | 1/1972 | Snowden . | |
| 3,694,856 | 10/1972 | Kaufman et al. . | |
| 3,705,813 | 12/1972 | Vogel et al. . | |
| 3,729,773 | 5/1973 | Dillon | 452/173 |
| 3,934,044 | 1/1976 | Busch et al. . | |
| 3,996,386 | 12/1976 | Malkki et al. . | |
| 4,234,537 | 11/1980 | Hersom et al. . | |
| 4,254,152 | 3/1981 | Janovtchik . | |
| 4,255,459 | 3/1981 | Glen . | |
| 4,473,004 | 9/1984 | Wells et al. . | |
| 4,556,572 | 12/1985 | Kaufman, Jr. et al. . | |
| 4,636,395 | 1/1987 | Robinson, Jr. et al. . | |
| 4,731,908 | 3/1988 | Thorsen . | |
| 4,760,780 | 8/1988 | Silvestrini et al. . | |
| 4,902,522 | 2/1990 | Rudibaugh . | |
| 4,933,200 | 6/1990 | Shimizu . | |
| 4,966,072 | 10/1990 | Ellis-Brown . | |
| 4,996,741 | 3/1991 | Covell, III | 452/74 |
| 5,043,175 | 8/1991 | Bayley et al. . | |
| 5,045,021 | 9/1991 | Borup | 452/74 |
| 5,072,663 | 12/1991 | Ellis-Brown . | |
| 5,093,140 | 3/1992 | Watanabe . | |
| 5,184,538 | 2/1993 | Ledet . | |
| 5,281,428 | 1/1994 | Morgan . | |
| 5,326,308 | 7/1994 | Norrie | 452/77 |
| 5,439,694 | 8/1995 | Morris, Jr. . | |
| 5,503,594 | 4/1996 | Karubian et al. . | |
| 5,514,403 | 5/1996 | Webb et al. . | |
| 5,560,952 | 10/1996 | Miller et al. . | |
| 5,607,349 | 3/1997 | Karubian et al. . | |
| 5,632,670 | 5/1997 | Gwyther . | |

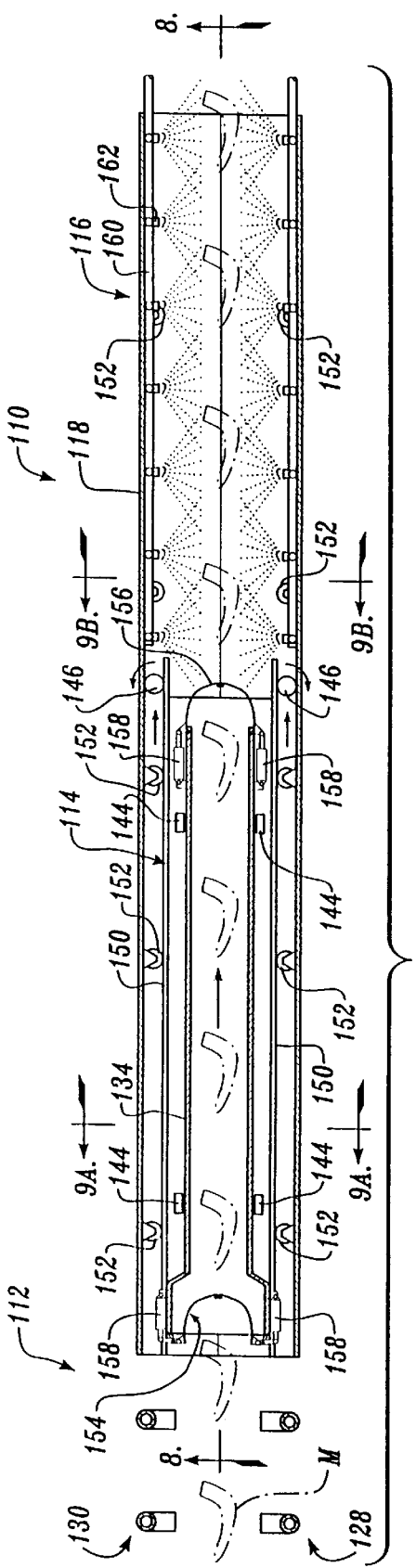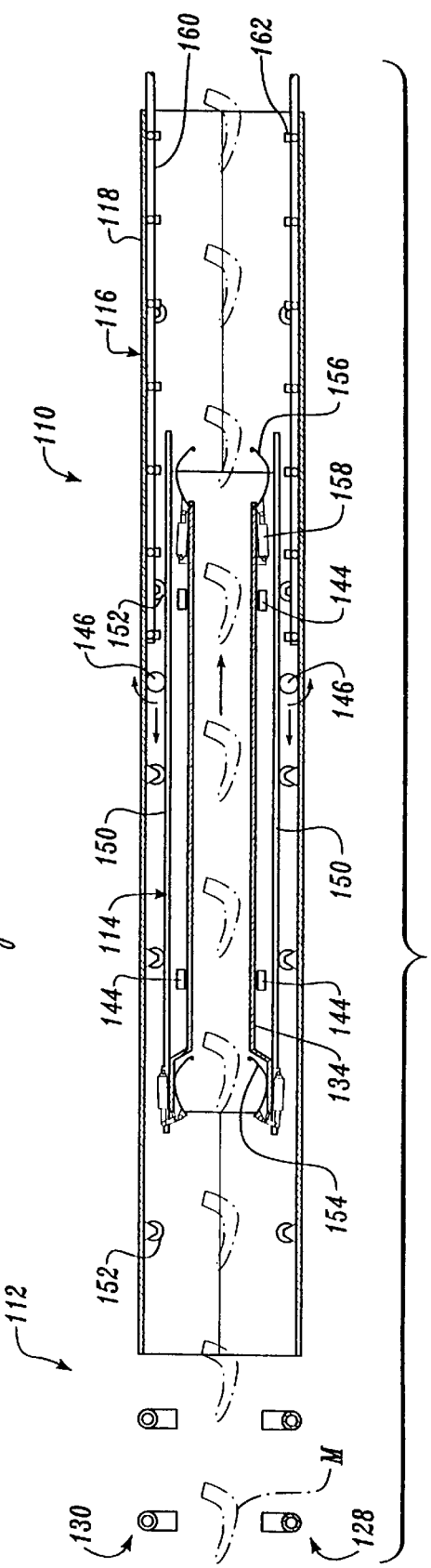

— 1 —

APPARATUS FOR STEAM PASTEURIZATION OF MEAT

RELATED APPLICATION

This is a divisional of prior application Ser. No. 08/553,852, filed Nov. 6, 1995, which in turn is a continuation-in-part of U.S. utility patent application Ser. No. 08/335,437, filed Nov. 7, 1994, the benefit of the filing dates of which is claimed herein.

FIELD OF THE INVENTION

This invention relates generally to apparatuses and processes for cleaning meat, and more particularly, to a processor and method for destroying coliform bacteria and other surface pathogens on meat.

BACKGROUND OF THE INVENTION

Concerns over pathogens on meat have been elevated in recent years due to *E-coli* related illnesses and deaths. In response, certain regulations have been imposed on food preparers and recommendations have been made to increase the likelihood that pathogens are killed. For example, restaurants must cook hamburger at 160° F. throughout for at least five seconds.

Such end user regulations have been made in an attempt to correct a problem that begins during meat processing. *E-coli*, other coliform bacteria, and many other pathogens reside on the surface of meat beginning with the meat carcass processing. The pathogens originate from fecal matter and other contaminants on the surface of the meat. Without adequately destroying these pathogens, the meat is processed, packed, and shipped to the distributor, retailer, or consumer. It is then left to the consumer or preparer of the meat to address a problem that by then can be even worse. The bacteria may have further grown or may reside throughout the meat. This is the case, for example, with ground meat since during meat processing the surface pathogens are distributed throughout the meat.

The only precaution currently taken by the meat processors is to spray the carcasses with water at 120–140° F. This measure is not necessarily effective or efficient at destroying the surface pathogens. Not all pathogens are killed at these temperatures and large volumes of water are required, along with a large amount of energy to heat the water, since the water cannot easily be recirculated if contaminants are to be avoided.

The process and apparatus of the present invention were developed to effectively and efficiently stop pathogen-infested meat and poultry products from reaching the end user.

SUMMARY OF THE INVENTION

The difficulties and drawbacks of the prior art methods and apparatuses for destroying coliform and other pathogenic bacteria on the surface of meat such as beef, poultry, pork and other meat products are overcome by the apparatuses and methods of the present invention. The apparatuses and methods of the present invention destroy pathogenic bacteria and other harmful contaminants on all the surface areas of the meat without introducing chemicals or other harmful and expensive products into the process. The methods and apparatuses are also carried out effectively and inexpensively.

An apparatus for destroying pathogens on meat is disclosed. The apparatus includes a dewatering chamber, a steam heating chamber, a chilled water chamber, and a meat conveyor. The dewatering chamber includes an air blower with nozzles for blowing air at the surface of the meat to remove surface water from the meat. The steam chamber is disposed adjacent the dewatering chamber. The steam chamber includes a steam chamber enclosure that is sealed for maintaining a positive pressure in the steam chamber relative to the dewatering chamber. The steam chamber also includes a steam supply line for filling and maintaining the steam chamber with steam. The chilled water chamber is disposed adjacent the steam chamber opposite from the dewatering chamber. The chilled water chamber has nozzles for spraying chilled water onto the surface of the meat for rapidly cooling the meat, after it is passed through the steam chamber. The meat conveyor extends through the dewatering chamber, the steam chamber, and the chilled water chamber. The meat conveyor supports the meat and transfers it from chamber to chamber. A method for destroying pathogens on meat is also disclosed that includes the steps of removing surface water from the meat, passing the meat through a steam heating chamber having a positive pressure relative to the outside of the steam chamber, to quickly heat the exterior of the meat then rapidly chill the surface of the meat.

The steam chamber further includes a floor that is sloped to collect the condensate that drips from the meat. At the lowest point in the floor a pressure retaining drain allows the water to be channeled away from the steam chamber without release of pressure therefrom. The steam chamber enclosure also includes pressure retaining entrance and exit doors to maintain the positive pressure in the steam chamber as meat enters and exits the steam chamber. The steam chamber also includes a steam distribution system extending along the length of the steam chamber enclosure and including outlets to dispense steam into the steam chamber.

The air nozzles in the dewatering chamber are preferably arranged in banks on either side of the conveyor that transfers the meat, such that the meat is advanced between the two banks of air blower nozzles. An enclosure around these air nozzle banks is also preferably provided.

The chilled water chamber also includes, preferably, water spray banks on either side of the conveyor for spraying chilled water over the entire surface of the meat. An enclosure also surrounds the chilled water sprayers to form a chilled water chamber.

An alternate preferred method for destroying pathogens on meat that is attached to a conveyor is also disclosed. The method includes moving at least one first unit of the meat (e.g. a beef carcass) into a movable steam chamber, moving the steam chamber with the first unit enclosed therein along the conveyor, subjecting the first unit to steam within the steam chamber, removing the steam chamber from the first unit, and rapidly chilling the surface of the first unit of the meat. Subjecting the first unit to steam heats the surface of the first unit of meat to destroy the pathogens.

In a preferred embodiment, the steam chamber moves at substantially the same rate as the conveyor during the step of moving the steam chamber. In this manner, the steam chamber does not have to be stopped while steam surrounds the first unit of meat. The step of removing the steam chamber from the first unit of meat is preferably carried out by moving the steam chamber in a direction opposite the direction of travel of the conveyor along the path of the conveyor. Preferably, the steam chamber includes an entrance door at the upstream end of the steam chamber and an exit door at the downstream end. The method further includes closing the entrance door after the first unit moves into the steam chamber and opening the entrance and exit doors before removing the steam chamber from the first unit.

A second unit of meat may next be enclosed within the steam chamber upon removing the steam chamber from the first unit. The steam chamber is rapidly evacuated of steam before the step of removing the steam chamber from the first unit.

The step of rapid chilling is carried out by directing a coolant fluid at the surface of the first unit of meat. The temperature of the coolant fluid is lower than that of the surface of the meat. The coolant fluid preferably includes water and may contain an antimicrobial agent in the water. Alternatively, the coolant fluid may include ambient air or another gas that may be cooled relative to the ambient air.

The method of the present invention preferably includes a step of dewatering the first unit of meat before moving the meat into the steam chamber. Furthermore, the steam surrounding the meat within the steam chamber may alternatively be superheated or subcooled.

The process may be monitored by recording heat-treating conditions of the first unit of meat by ascertaining the initial surface temperature, the surface temperature as the meat is subject to the steam, and the surface temperature after being chilled. The length of heat treatment may also be ascertained and recorded. Rather than measuring the surface temperature of each unit of meat within the steam chamber, this information may be determined by measuring the temperature within the steam chamber as the meat is being transferred into the steam chamber, during the steam treatment process and also during the cooling process. Standard temperature gauges may be utilized for monitoring the temperature within the steam chamber.

Another preferred apparatus for pasteurizing meat held by a conveyor, as the meat is carried along by the conveyor, is also provided. This preferred apparatus includes a stationary frame, a steam chamber and a cooling system. The stationary frame extends along a portion of the conveyor. The steam chamber is movably coupled to the stationary frame and is sized to enclose at least one piece of meat being held by the conveyor. The steam chamber includes a drive system to move the chamber along a portion of the conveyor to heat the surface of the meat as the meat moves with the conveyor. The steam chamber includes an upstream end and a downstream end. The steam chamber drive system is operable to retract the steam chamber along the stationary frame in a direction opposite to the direction of movement of the conveyor. The cooling system is associated with the stationary frame and is for rapidly cooling the surface of the meat that has been heated by the steam.

The apparatus may also include a stationary enclosure associated with the stationary frame. The stationary enclosure surrounds the steam chamber and may also surround the cooling system. A vacuum system is secured to the stationary enclosure and is operatively engaged with the steam chamber to evacuate steam therefrom.

The steam chamber includes an entrance door attached thereto at the upstream end of the steam chamber. An exit door is also provided attached to the steam chamber at the downstream end. The exit door preferably includes curved panels with concave sides facing the interior of the steam chamber. The panels include actuators for opening and closing the steam chamber.

The cooling system preferably includes fluid jets attached to the stationary frame. The fluid jets may be water jets, air jets or other types of jets.

An alternate preferred embodiment of the invention includes a system for removing surface liquid, a steam supply and a system for cooling the surface of meat, all carried within a chamber. The chamber receives, and at least partially encloses, the meat. The system for removing surface liquid from the meat may be both secured to the inside of the side walls of the chamber, as well as the system for cooling the surface of the meat. The steam supply is coupled to the chamber to apply steam to the surface of the meat. The meat preferably hangs from and moves along a conveyor. The apparatus also includes a stationary frame located below the conveyor, with the chamber being powered to move relative to the frame. Thus, the chamber moves along the path of the conveyor with the meat such that the meat can be processed as the meat moves. The system for removing surface liquid preferably includes fluid lines attached to and extending within the chamber. The fluid is blown at the surface of the meat within the chamber to remove excess surface liquid from the meat prior to steam treatment. The cooling system preferably includes a coolant fluid supply and coolant lines attached to and extending within the chamber. The coolant may be applied to the surface of the meat within the chamber after steam treatment of the meat.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a top view of the processor of FIG. 5 showing a steam chamber in a retracted position;

FIG. 7 is a top view of the processor of FIG. 5 showing the steam chamber being retracted as the meat continues to move in a downstream direction;

DETAILED DESCRIPTION OF THE PREFERRED EMBODIMENTS

Figure 1:
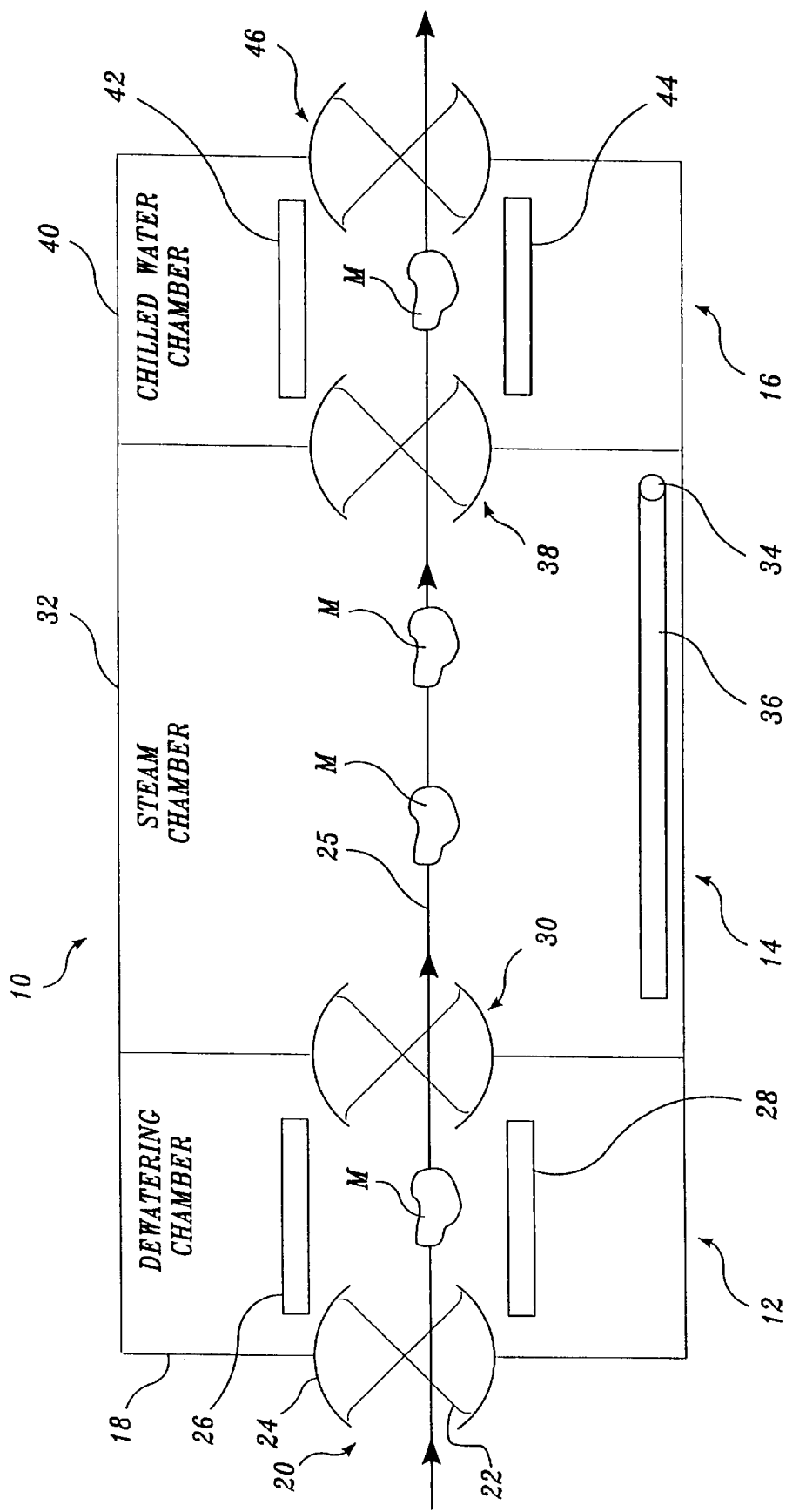
FIG. 1 is a schematic plan view of the process and apparatus of the present invention illustrating the movement of a side of beef along an overhead conveyor through the various chambers of the present invention.

A schematic diagram of one preferred embodiment of the present invention is shown in FIG. 1. A processor 10 is provided to rid the surface of unskinned or skinned meat M of any pathogens, such as *E-coli* 0157:H7 and other coliform-type bacteria, listeria, and salmonella. Processor 10 includes three chambers: a dewatering chamber 12, a steam heating chamber 14, and a chilled water cooling chamber 16. Meat M passes through each of these chambers in series. After passing through chilled water chamber 16 meat M has been cleansed from surface bacteria and is ready to be further processed by cutting, packaging, freezing, or otherwise. Note that while the preferred embodiment refers to beef, other meat can be processed with the apparatus and method of the present invention, such as pork or poultry. Also, while in the preferred embodiment the meat passes through different chambers to be processed, the meat could remain stationary while the process steps are carried out with corresponding equipment.

The first section of processor 10 entered by meat M is dewatering chamber 12. Dewatering chamber 12 includes a dewatering chamber enclosure 18 to seal off dewatering chamber 12 from external moisture or pollution. A processor entrance door 20 is provided at one side of dewatering chamber enclosure 18 to allow meat M to pass into dewatering chamber 12. Processor entrance door 20, as well as the other doors referenced below, is constructed in a pinwheel fashion with a plurality of door arms 22 extending outwardly from a central vertical axis about which the arms 22 rotate. A shield 24 is formed in circular arc sections to engage the outer ends of door arms 22. Shield 24 includes arcuate portions on both sides of door arms 22 such that a positive closure of dewatering chamber 12 is always achieved as door arms 22 rotate. At least two of door arms 22 will always be in contact with shields 24 to enclose the entrance to the dewatering chamber 12.

Alternatively, dewatering chamber 12 may be omitted from processor 10. The meat M would then simply enter steam chamber 14 directly.

Meat M rides through processor entrance door 20 hanging from a conveyor 25. Conveyor 25 is preferably constructed in a known fashion as a standard meat conveyor with an overhead chain to move the product along a processing stream. However, other conveyor systems may also be used.

After meat M passes through processor entrance door 20 it travels along conveyor 25 between left and right air banks 26 and 28. Air banks 26 and 28 remove surface moisture from meat M prior to meat M entering into steam chamber 14. Further details of air banks 26 and 28 are discussed below in connection with FIG. 2.

Conveyor 25 then carries meat M to the exit side of dewatering chamber 12 and into the steam heating chamber entrance door 30. Steam chamber entrance door 30 closes the air path between dewatering chamber 12 and steam chamber 14 such that a positive seal is created between the two chambers. Steam chamber entrance door 30 is preferably similar in construction to processor entrance door 20. However, besides prohibiting contamination from entering steam chamber 14, stream chamber entrance door 30 also provides an air seal so that a positive pressure may be created in steam chamber 14 relative to dewatering chamber 12.

Steam chamber 14 includes a steam chamber enclosure 32 which functions to hold steam and a positive pressure therewithin. Conveyor 25 runs through steam chamber 14 from steam chamber entrance door 30 to a steam chamber exit door 38. Within stream chamber 14 a steam delivery pipe 34 delivers steam to a steam distribution pipe 36 which extends along the steam chamber 14. Further details of steam chamber 14 will be discussed below in connection with FIG. 3.

Meat M then passes through steam chamber exit door 38 into cooling chamber 16. Steam chamber exit door 38 is similar in detail to steam chamber entrance door 30. Cooling chamber 16 includes an enclosure 40 that keeps the spray of chilled water within chamber 16 and keeps contaminants away from meat M. Cooling chamber 16 includes left and right chilled water spray banks 42 and 44, respectively. A processor exit door 46 is provided at the output side of chilled water chamber 16. Preferably, processor exit door 46 is similar in construction to processor entrance door 20. Conveyor 25 then carries meat M from processor 10.

Figure 2:
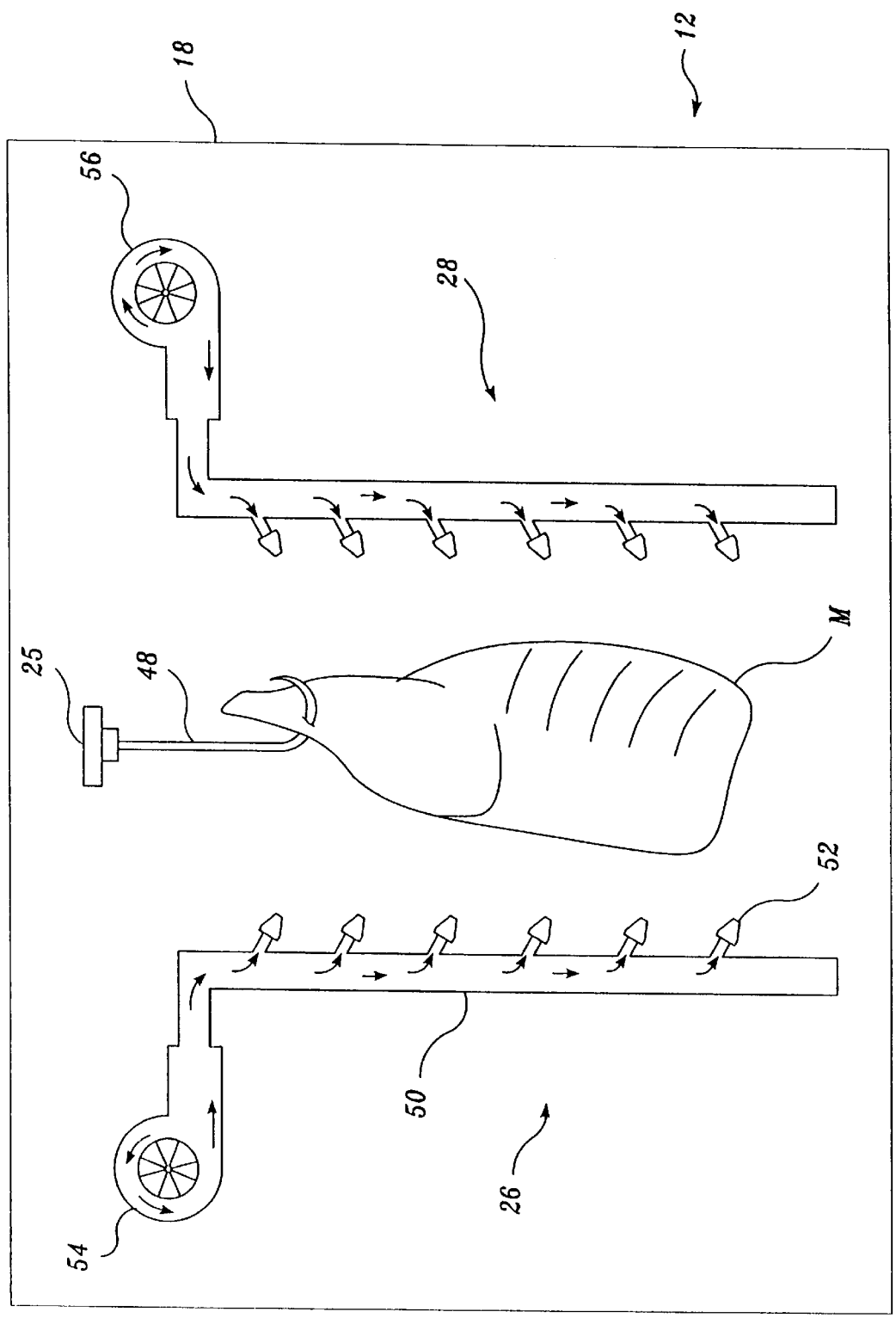
FIG. 2 is a semi-schematic elevational view of the dewatering chamber of the present invention.

As seen in FIG. 2, conveyor 25 also includes a hook 48. Hook 48 is used to secure meat M such that meat M hangs therefrom as it travels through chambers 12, 14, and 16.

The details of dewatering chamber 12 will be discussed. Dewatering chamber 12 includes air manifold pipes 50 with nozzles 52. Manifold pipes 50 and nozzles 52 form left and right air banks 26 and 28. Nozzles 52 shoot air at high velocity at meat M to substantially remove surface water that may reside on the surface or in the crevices of meat M. The high pressure air is provided by left and right blowers 54 and 56. The air travels from the blowers through air pipe 50 and out nozzles 52 against meat M. Air banks are positioned on both sides of meat M so that standing areas or droplets of surface water are substantially removed from the entire surface of meat M before entering steam chamber 14. Removal of substantially all significant amounts of standing surface water is preferred so that, once within steam chamber 14, a significant amount of heat is not absorbed by surface water but instead is transferred directly to the surface of the meat to destroy pathogens. The surface of the meat may still be moist to the touch, but dewatering removes most standing water, whether it be areas of water on the meat surface, or just droplets of water.

Figure 3:
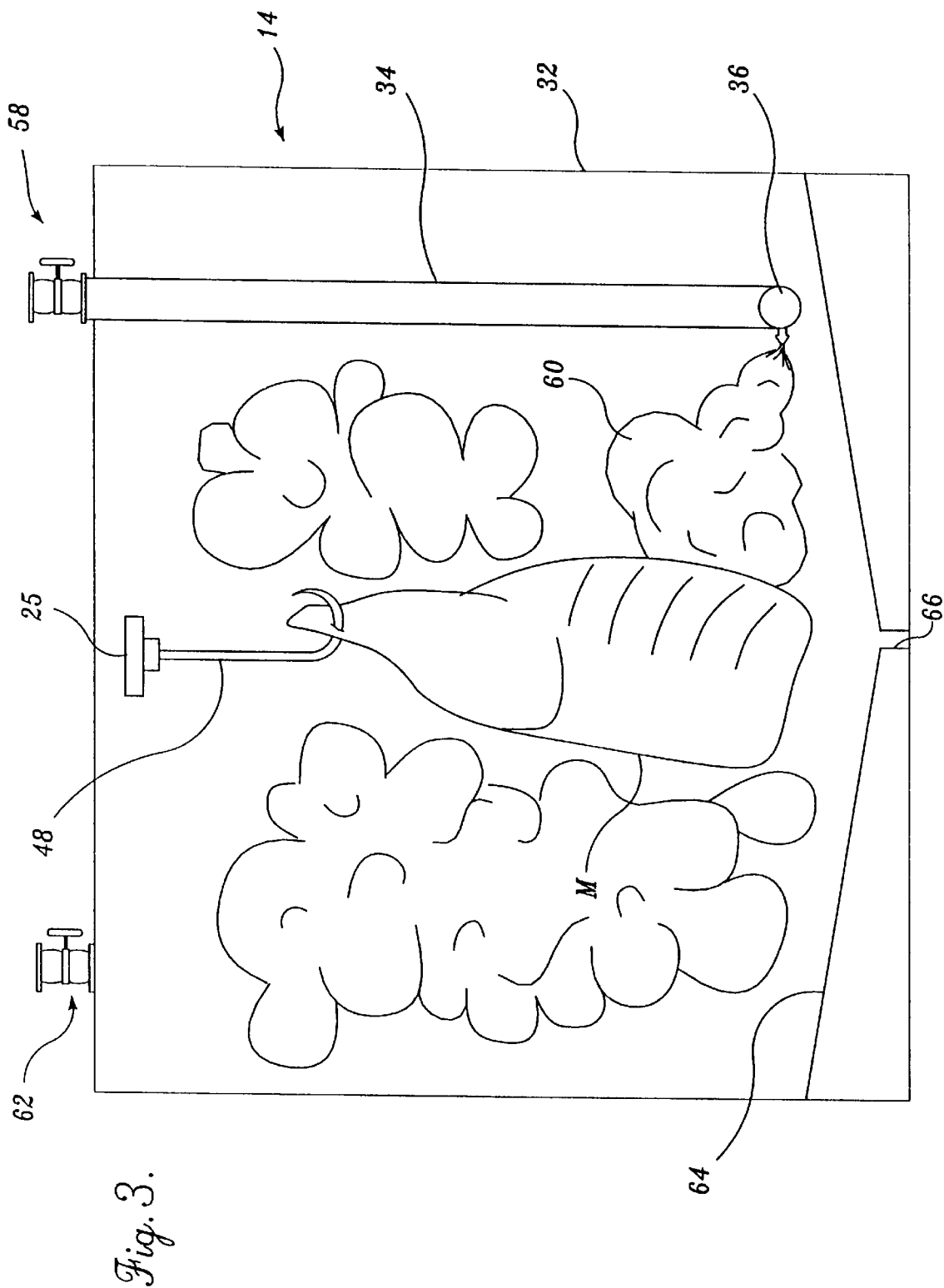
FIG. 3 is a semi-schematic elevational view of the steam chamber.

Referring now to the semi-schematic elevational view of steam heating chamber 14 illustrated in FIG. 3. An entrance valve 58 is provided at the top of steam chamber and closure 32 to deliver steam 60 through delivery pipe 34 and distribution pipe 36. Steam 60 is continually pumped into heating chamber 14 through pipe 36 such that a positive pressure is created within heating chamber 14. The preferred pressure differential is about two inches of water. Other positive pressures could be used, preferably falling anywhere from about one-half to five inches of water relative to dewatering chamber 12 and the cooling chamber 16 as well as the outside environment. However, as little as 0.01 inches of water pressure may be used. A positive pressure within steam chamber 14 helps to ensure that steam 60 very rapidly comes into contact with all surface areas of meat M and air is excluded from steam chamber 14.

As steam 60 contacts and surrounds meat M after it passes through steam chamber entrance door 30, steam 60 heats the surface of meat M. Steam 60 within heating chamber 14 is preferably at 212° F. at saturation. The steam 60 may be superheated to a temperature above 212° F. A pressure relief valve 62 is in communication with the heating chamber enclosure 32 to maintain the desired positive pressure within heating chamber 14.

As steam 60 envelops and contacts the surface of meat M, heat is drawn into the surface of meat M through steam contact. Steam condenses on the surface of meat M. The condensation of steam 60 onto the surface of meat M produces a transfer of heat energy, specifically the change-of-state energy from steam 60, to the surface of meat M. This transfer of energy heats the surface of meat M very quickly and effectively to kill any pathogens residing thereon.

As the condensation continues, water drips to the bottom of steam chamber 14. Steam chamber 14 is provided with a sloped floor 64 and a drain 66 at the bottom thereof to collect this water. Drain 66 is constructed such that pressure does not escape therefrom.

Meat M is preferably kept within steam chamber 14 for approximately 2½ to 30 seconds, 10 seconds being optimal. The surface of meat M is heated one to five microns deep at approximately 160° F.–198° F. during this time. Meat M may also stay within steam chamber 14 a longer amount of time. However, between 2½ to 30 seconds is a preferred amount of time to maintain the surface of meat M between 160 and 198° F. to sufficiently reduce coliform bacteria, salmonella, and other pathogens. The preferred temperature range at the surface of meat M is between 160° F. to 198° F. The time within steam chamber 14 may be set by the speed of conveyor 25 combined with the length of steam chamber 14. The temperature of the meat surface may be extrapolated from temperature measurements taken at various locations, preferably about four, within steam chamber 14.

Figure 4:
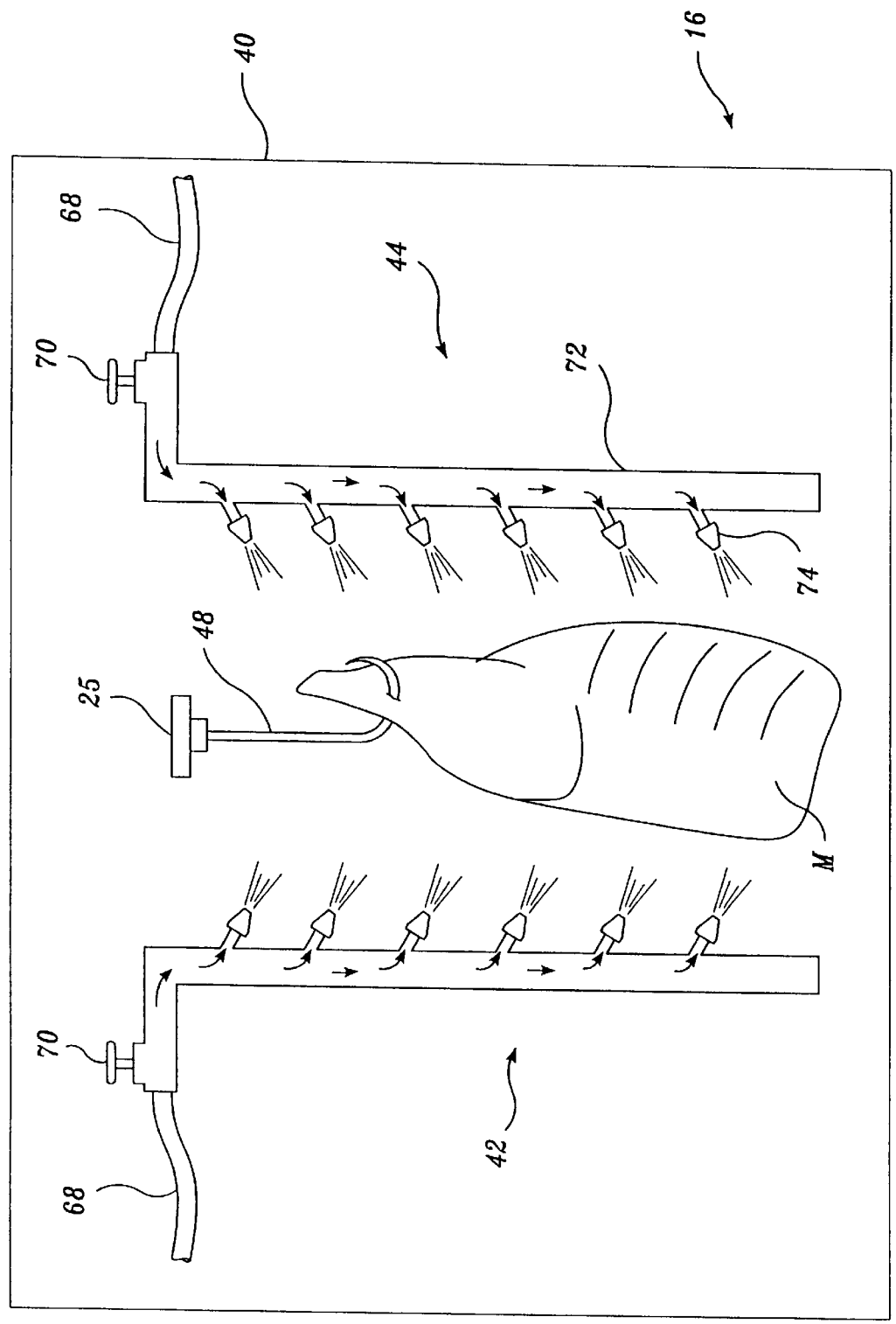
FIG. 4 is a semi-schematic elevational view of the chilled water chamber of the present invention.

Cooling chamber 16 is provided to very rapidly dissipate the heat and thus stop the transfer of heat into meat M. Meat M enters into cooling chamber 16 after it passes through steam chamber exit door 38. See FIG. 4. Once within cooling chamber 16, conveyor 25 transfers meat M between left and right spray banks 42 and 44. Chilled water at preferably about 40° F. is supplied by water supply pipe 68. The water passes through water valve 70 and into water delivery pipes 72. The water is under pressure such that it sprays through water nozzles 74 to contact and thus quickly chill the surface of meat M to remove the heat and provide a final rinse.

Meat M continues along the path of conveyor 25 through processor exit door 46. Meat M exits in a clean state with the surface of meat M effectively pasteurized from any fecal matter and the pathogens that accompany it or other contaminants that may be on the surface of meat M.

In summary, meat M passing through a dewatering chamber to remove excess moisture therefrom prevents surface moisture from absorbing the heat energy from the change of state of the steam in steam chamber 14 to condensation on the surface of meat M. This heat energy effectively destroys the pathogens. Afterwards, the chilled water in cooling chamber 16 rapidly cools the meat so that it is not significantly heated on the surface. This process is clean and effective. It does not employ objectionable chemicals, bacteria, radioactivity, or other expensive processes while ensuring that pathogens such as coliform bacteria, listeria, and salmonella are eliminated from the meat.

Figure 5:
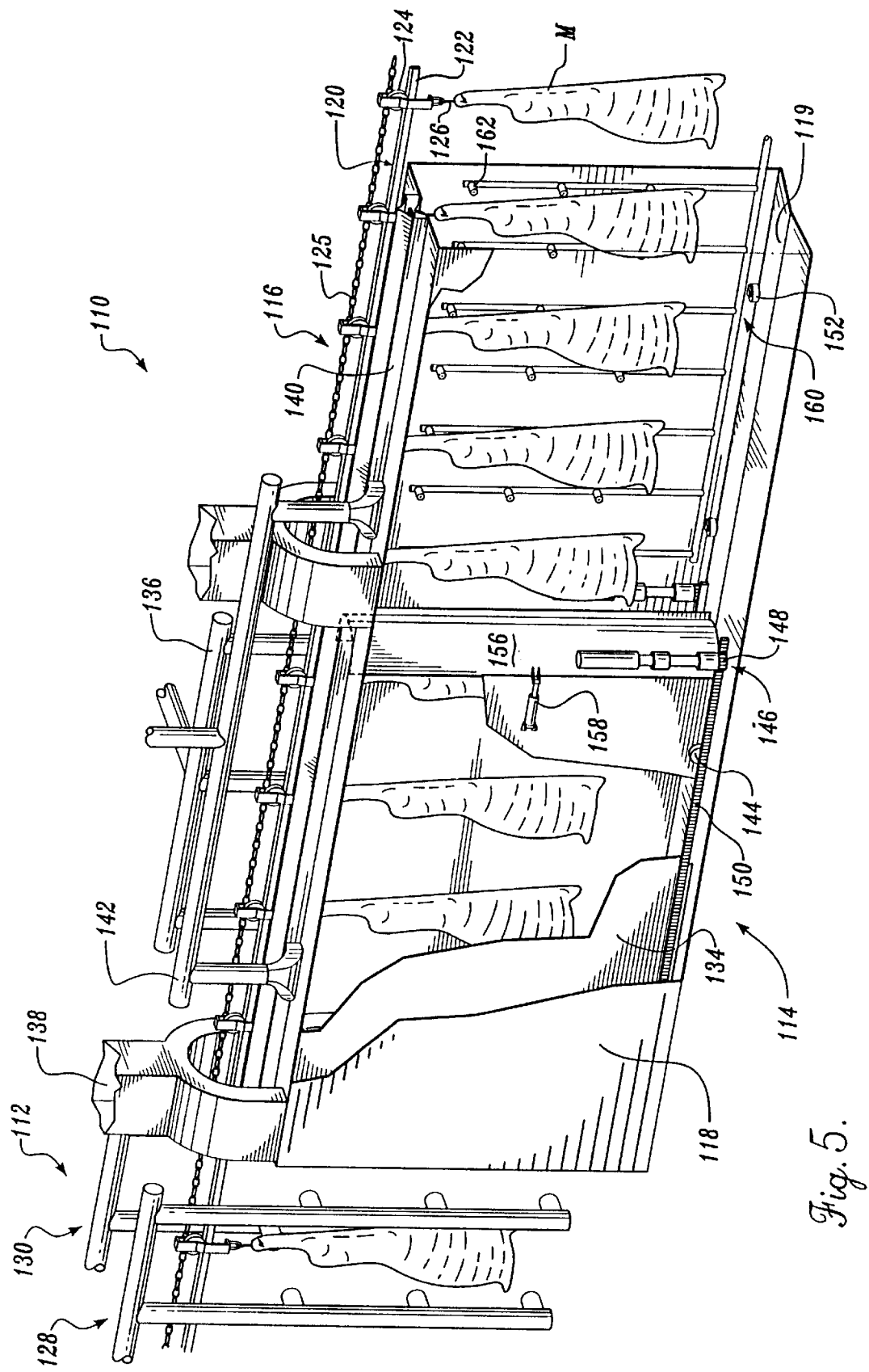
FIG. 5 is an isometric view of another preferred embodiment of the present invention showing meat being moved through a processor.

FIG. 5 illustrates another preferred embodiment of the present invention. In this embodiment, a processor 110 destroys any disease-carrying material on the surface of the meat while the meat M is moving continuously along a conveyor path. It is not necessary to stop the conveyor path, but if the conveyor should stop while the meat is in the middle of processor 110, the meat is effectively cleansed and cooled.

Processor 110 includes a dewatering station 112, a steam chamber 114, and a cooling chamber 116. The stream chamber 114 and cooling chamber 116 are both contained within an outer enclosure 118. Outer enclosure 118 is generally parallelepiped in shape and includes an outer enclosure floor 119 that is peaked along the longitudinal center line of the floor. The floor 119 slopes towards the outsides of outer enclosure 118 for collection of condensate runoff from the meat. The cross-sectional size of outer enclosure 118 is somewhat larger than the typical size of a unit of meat M. The length of outer enclosure 118 is approximately 33 feet in the embodiment shown in FIG. 5 that is adapted for use with sides of beef. Of course, the size, including the length, of the enclosure may be varied to accommodate different numbers of sides of beef to be treated at the same time and also for different types of meat, e.g., pork or poultry.

The processor 110 resides primarily below a standard conveyor 120 that is within the processing plant. A conveyor 120 includes a track 122 extending generally horizontally above the center of outer enclosure 118. Rollers 124 ride on top of track 122 and are pulled along by a drive chain 125. Hooks 126 extend below rollers 124 and into outer enclosure 118 as they move through processor 110. The meat M hangs from hooks 126 for processing.

The first stage of processor 110 includes dewatering station 112. Dewatering station 112 includes right air bank 128 and left air bank 130 positioned on the right and left sides of conveyor 120 respectively so as to direct a drying fluid, such as air, at the surfaces of meat M before meat M enters outer enclosure 118. As explained above with reference to the previously described embodiment, it is important to remove excess water from the surface of meat M before it enters steam chamber 114 so that effective heat transfer destroys any bacteria residing on the surface of meat M. Ideally, the drying air is directed at the meat shown in FIGS. 5–8 at a pressure of about 15 psig and at a high volume, i.e., of about 7000 cubic feet per minute. Air banks 128 and 130 may alternatively be arranged in a different fashion. Also, other excess water removal methods may be employed.

Steam chamber 114 ideally extends approximately half of the length of outer enclosure 118. Also ideally steam chamber 114 rides within outer enclosure 118 at all times. Steam chamber 114 includes side walls 134 for enclosing meat M. The steam chamber is illustrated as sized to accommodate four units of meat M (e.g., carcasses) at the same time. A steam supply header 136 is attached to the top of outer enclosure 118 and directs steam into steam chamber 114 as described below with reference to FIG. 9A. A pair of steam ventilation ducts 138 are also provided, attached to the top of outer enclosure 118 on either side of steam supply header 136. Steam ventilation ducts 138 are used to evacuate the steam S from steam chamber 114 as described below in further detail in connection with FIGS. 9A and 9B.

A protection plenum 140 is provided all along the length of outer enclosure 118 immediately below track 122. Protection plenum 140 is a longitudinal enclosure provided with a negative pressure by pulling a vacuum with protection plenum duct 142 in order to keep any steam seepage from contact with the rest of conveyor 120. Preferably, protection plenum duct 142 is connected to at least two locations along trolley protection plenum 140 in order to create negative pressure within the protection plenum and to thus avoid damage to conveyor 120.

Steam chamber 114 also includes support wheels 144 disposed at the bottom of side walls 134. Support wheels 144 support steam chamber 114 above enclosure floor 119 so that steam chamber 114 may move longitudinally within outer enclosure 118.

A chamber drive 146 is attached ideally near the middle of outer enclosure 118 between outer enclosure 118 and steam chamber 114 in order to move steam chamber 114 within outer enclosure 118. Chamber drive 146 preferably includes a servo drive, a brake, a gear motor and a pinion 148. Pinion 148 is positioned at the bottom of chamber drive 146 and along the side of the bottom of steam chamber 114. Racks 150 are provided all along the bottom of side walls 134 of steam chamber 114. Thus, steam chamber 114 may be moved within outer enclosure 118 by rack 150 being driven by pinion 148 of chamber drive 146.

Horizontally disposed guide wheels 152 are also provided to engage the outer surface of rack 150 in order to prevent yaw of steam chamber 114 while it is being moved within outer enclosure 118. Guide wheels 152 are rotatably journeyed on stationary brackets to the inside of outer enclosure 118. Chamber drive 146 is switched on when steam chamber 114 is filled with a desired number of units of meat M and moves steam chamber 114 at substantially the same rate of speed as conveyor 120, such that it moves along with meat M for a set period of time to apply steam S to meat M. Chamber drive 146 then quickly retracts steam chamber 114 to its start position as explained below.

Entrance doors 154 (not shown in FIG. 5) and exit doors 156 are provided on the ends of steam chamber 114 in order to seal the chamber for application of steam S. Door actuators 158 are mounted to side walls 134 of the steam chamber 114 in order to open and close entrance and exit doors 154 and 156.

The downstream end of outer enclosure 118 contains chilled fluid banks 160. Chilled fluid banks 160 include pipes which channel a cooling fluid, preferably water, to coolant nozzles 162. Coolant nozzles 162 are directed to meat M to spray a coolant fluid on the surface of meat M in order to quickly reduce the surface temperature of meat M after steam chamber 114 is retracted from meat M. Once meat M passes between chilled fluid banks 160 harmful surface bacteria has been destroyed and meat M is ready to move on to additional processing steps and shipment to retailers and consumers.

Figure 8:
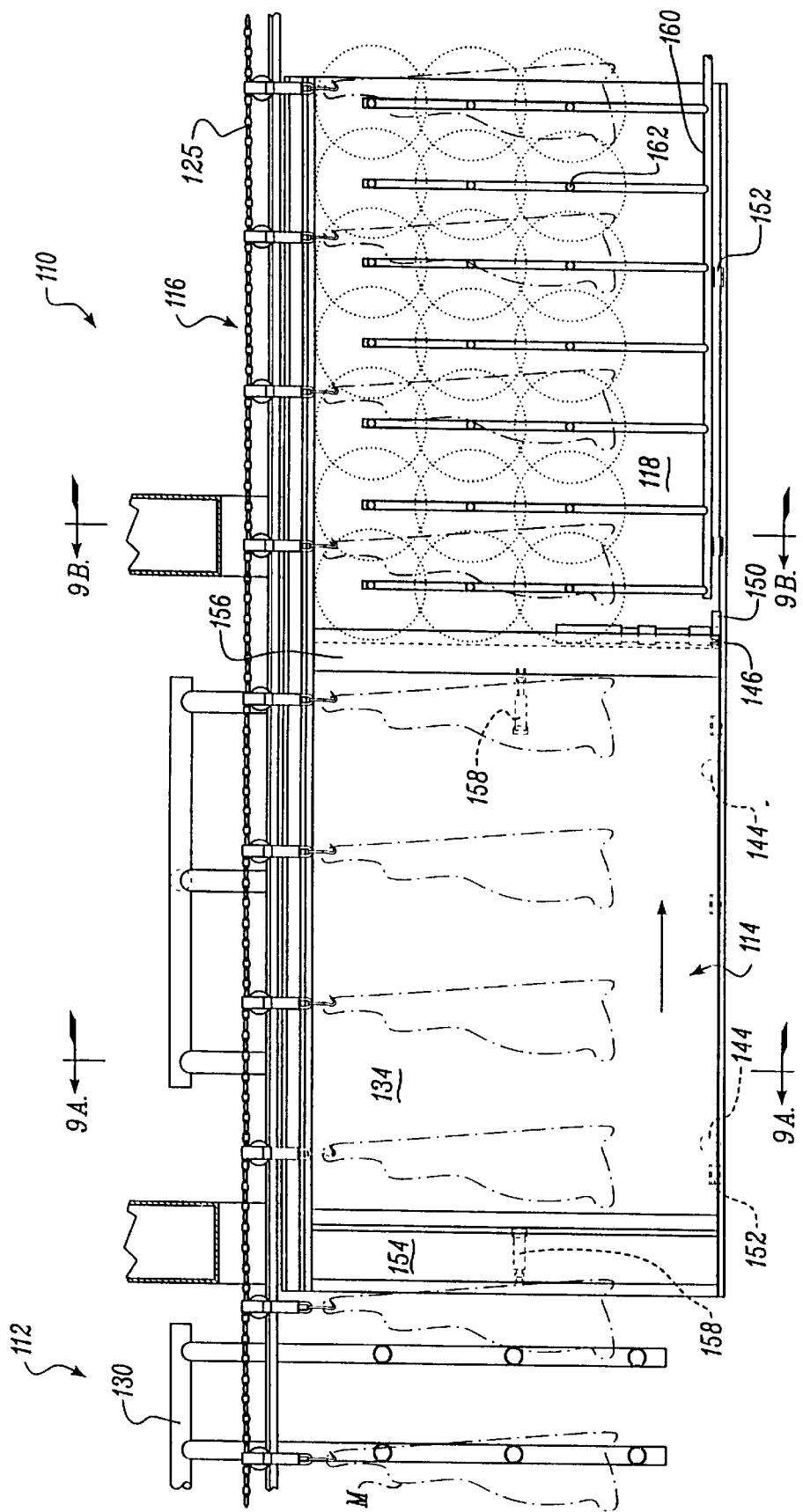
FIG. 8 is a cross-sectional elevational view showing the steam chamber in the position shown in FIG. 6.

FIGS. 6, 7 and 8 illustrate the movement of steam chamber 114 within outer enclosure 118 while meat M is processed with processor 110. Meat M, is supported by and moves along conveyor 120 during the entire process. Ideally the conveyor is moving at a substantially constant speed, but occasionally the conveyor speed may change, or the conveyor may even stop. Nonetheless, the present invention is capable of accommodating this change in conveyor speed.

As meat M enters into outer enclosure 118 it moves through entrance doors 154 into steam chamber 114. The distance between side walls 134 of steam chamber 114 is sufficient to enclose meat M therein. The length of steam chamber 114 is preferably long enough to enclose a desired number of units of meat M. Although four units are shown enclosed in FIGS. 6, 7 and 8, the length of the steam chamber 114 may be designed to accommodate a different number of units and also various types of meat.

Once four units of meat M enter into steam chamber 114, entrance door 154 and exit door 156 are closed by actuators 158. As soon as this occurs, steam chamber 114 begins to move along with meat M at the same rate as the movement of meat M while filling with steam (about 7.1 inches per second). Steam surrounds meat M preferably at a temperature of about 212° F. at sea level for a preferred length of time of 10 seconds. The temperature may be anywhere within the range of about 175° F.–500° F. and preferably surrounds the entire surface of meat M for a period of time between about 5 seconds and 30 seconds. The pressure within the chamber may be positive relative to ambient pressure to maintain steam purity. Temperature measurements are preferably taken at about four locations within steam chamber 114 and used to determine the temperature of the atmosphere within the steam chamber during the present process. Steam chamber 114 is moved within outer enclosure 118 by chamber drives 146 acting on rack 150. Guide wheels 152 stabilize the movement of steam chamber 114 as it moves with meat M.

As seen in FIG. 7, once the desired time for application of steam to the surface of meat M has been met, entrance and exit doors 154 and 156 are opened and steam chamber 114 is quickly retracted back (preferably at about 12 feet per second) to the upstream end of outer enclosure 118 to enclose additional meat M to begin the process over again. Meanwhile, as shown in FIG. 6, meat M that has been treated, continues to move through outer enclosure 118 within cooling chamber 116. Chilled fluid banks 160 spray coolant on the outer surfaces of meat M to rapidly decrease the surface temperature of meat M. This coolant prevents meat M from being cooked at its surface. The coolant W directed at meat M through nozzles 162 may be any coolant fluid such as air, water, or water, perhaps with an antimicrobial agent mixed therein. Specific antimicrobial agents that may be used include lactic acid, trisodium phosphate, acetic acid, and chlorine dioxide.

Should conveyor 120 stop, steam chamber 114 will also be stopped by a switch that is triggered by movement or nonmovement of conveyor 120. Steam continues to be applied to meat M for the desired period of time after which doors 154 and 156 are opened and air is rushed through steam chamber 114 to evacuate steam S and to provide a cooling effect on meat M. Also, simultaneously the flow of chilled fluid may be started, which would assist in rapidly cooling the meat even though the fluid may not be actually spraying the surface of the meat. Thus, processor 110 can process meat with the continually moving line or with inadvertent stops in the line as meat M moves through processor 110. As such, the remaining processes within the plant that may cause conveyor 120 to stop can go on without worry of processor 110 and meat M being adversely affected.

Figure 9A:
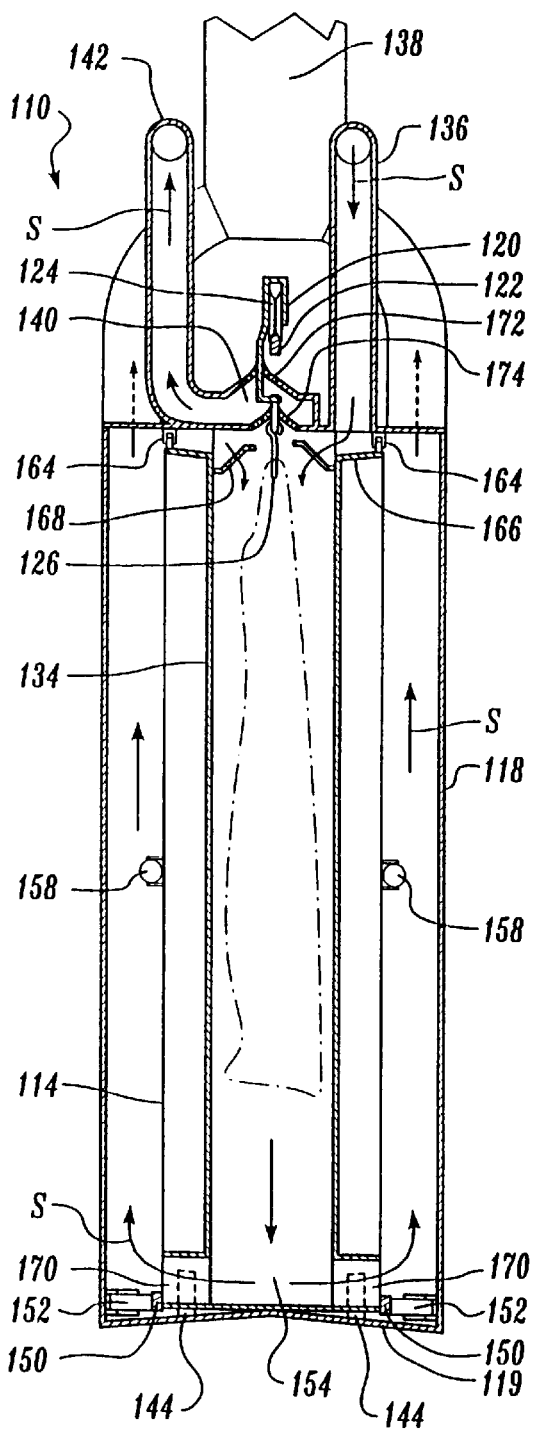
FIG. 9A is a cross-sectional end view showing the circulation of steam through the steam chamber.

FIGS. 9A and B illustrate the movement of steam S through steam chamber 114. FIG. 9A illustrates the steam supply cycle as steam surrounds meat M and simultaneously pushes out any air surrounding meat M. Steam enters through steam supply header 136 through the top of outer enclosure 118. Chamber seals 164 provide a sealing engagement between the top of steam chamber 114 and outer enclosure 118. Steam supply header enters within the inside of chamber seals 164 such that the steam is channeled within side walls 134 of steam chamber 114. First and second deflection plates 166 and 168, respectively, are provided along the top of side walls 134 of steam chamber 114. First deflection plate 166 is nearest to steam supply header 136 and channels steam, as explained below in connection with FIG. 10. Steam then surrounds and moves down along the top and sides of meat M while simultaneously pushing air out the bottom of steam chamber 114 through gas escape openings 170. Gas escape openings 170 are provided along the bottom of steam chamber 114 to allow air and steam to be pulled out of the bottom of steam chamber 114 up and through steam ventilation duct 138. As steam S is pumped into steam chamber 114 the heavier air moves toward the bottom and is pulled out of steam chamber 114 along the sides of steam chamber 114 within outer enclosure 118. Thus, steam uniformly covers the surface of meat M without any substantial air pockets. This ensures that adequate heat transfer takes place at the surface of meat M without any insulating effect of air. The volume of steam supplied to the steam chamber 114 to purge the chamber and treat the meat M is ideally about three to four times the volume of the steam chamber. However, depending on the temperature and pressure of the steam and other factors, more or less steam may be supplied to the steam chamber.

Figure 9B:
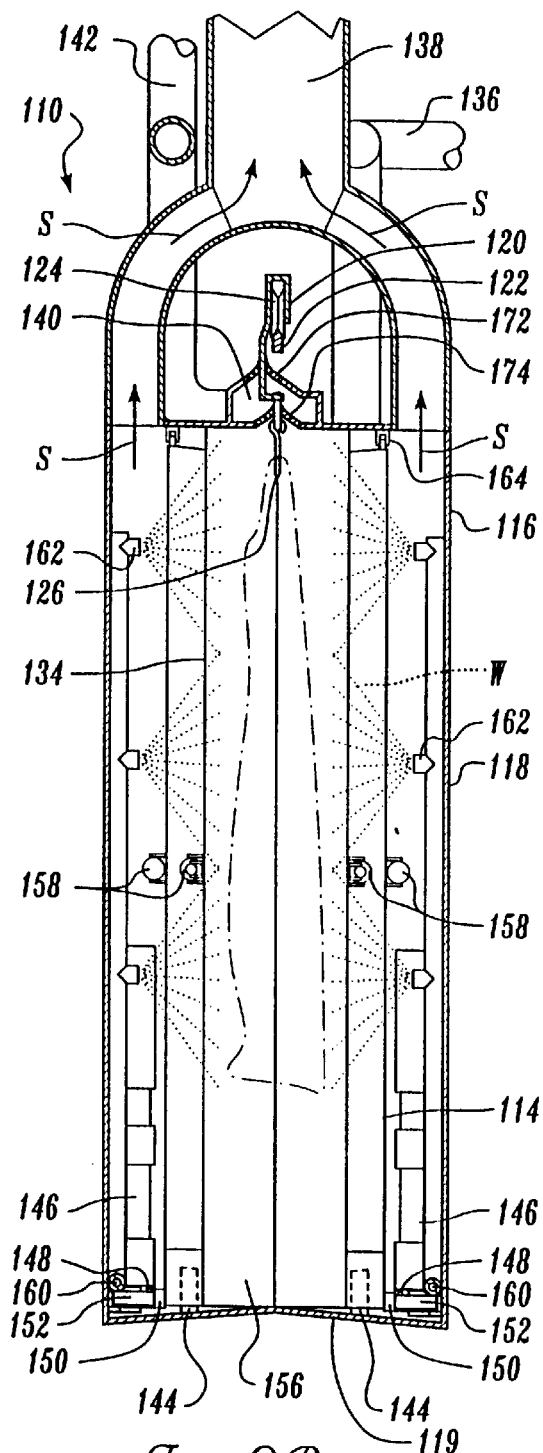
FIG. 9B is a cross-sectional end view showing the coolant water being sprayed on a carcass after the steam chamber has been retracted.

FIG. 9B illustrates the cooling of meat M after steam is evacuated from steam chamber 114 and steam chamber 114 is retracted from meat M which is now advanced to the downstream end of outer enclosure 118.

Figure 10:
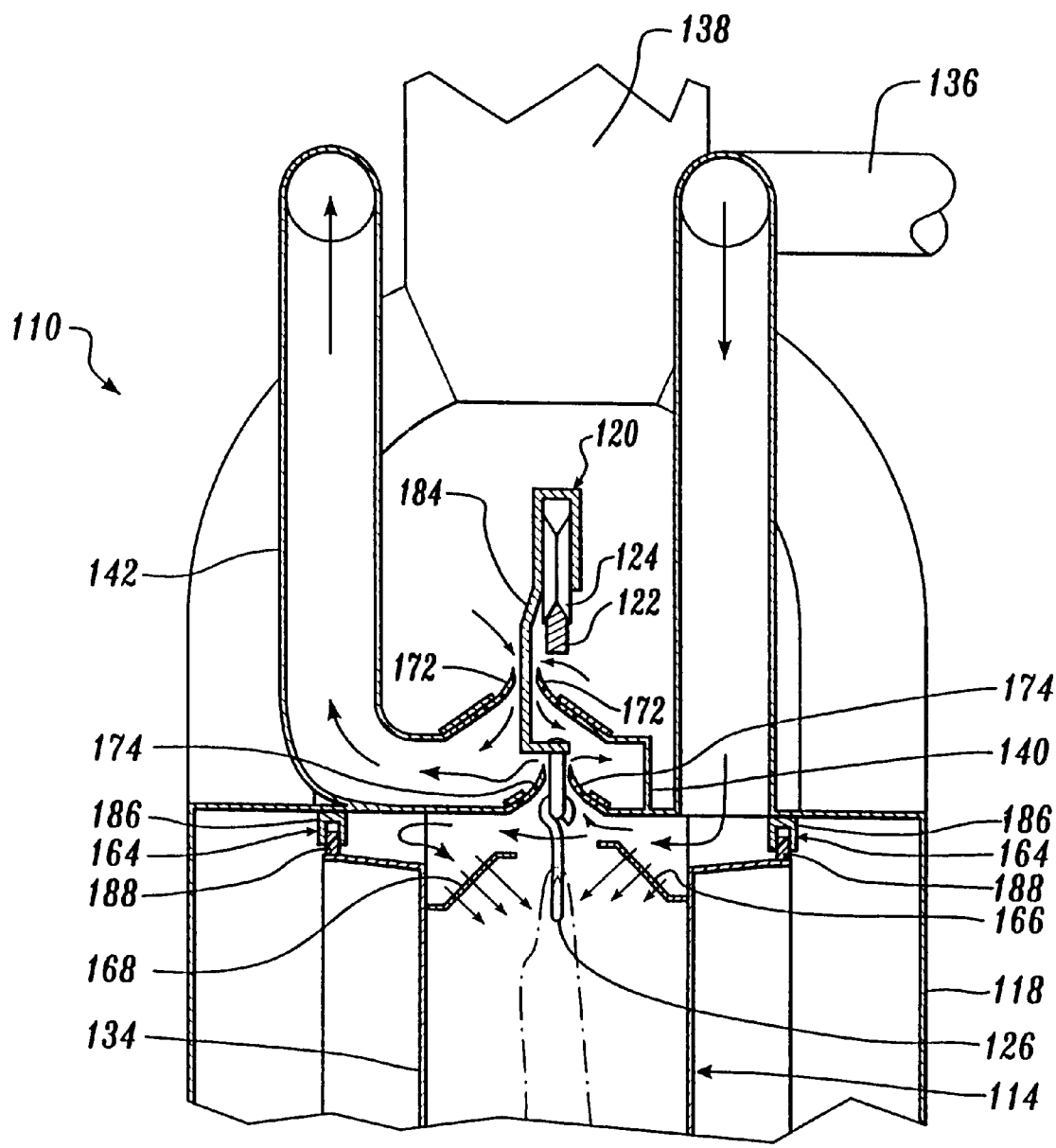
FIG. 10 is a sectional view showing the functioning of the protection plenum ventilation system.

FIG. 10 illustrates in further detail the flow of steam into steam chamber 114, as well as the functioning of protection plenum 140. As steam moves from steam header 136 it is channeled toward meat M with first deflection plate 166. First deflection plate 166 is approximately 40% open with holes formed therein, such that it allows some steam to enter directly to the top of meat M to fill steam chamber 114, while channeling additional steam to the opposite side of meat M to be directed down through second deflection plate 168 which is approximately 60% open. Thus, steam substantially evenly moves down all sides of meat M. Other ratios of openness of deflection plates 166 and 168 may be used depending on the pressure and volume of steam supplied, such that steam moves evenly over the surface of meat M to push air out the bottom of steam chamber 114 so that no pockets of air remain on the surface of meat M.

Also illustrated in further detail are chamber seals 164. Chamber seals 164 include an upper member 186 which is an inverted U-shape and a lower member 188 projecting upwardly from the top of outer wall 132 to meet within upper member 186. Upper members 186 effectively forms a channel beneath the top side of outer enclosure 118. Thus, little or no steam escapes through chamber seal 164.

Protection plenum 140 provides a channel for capturing escaped steam along the top of outer enclosure 118 beneath track 122. Steam is pulled out of protection plenum 140 with plenum ventilation duct 142 such that a negative pressure is maintained within protection plenum 140, relative to the interior of steam chamber 114 and to the ambient air. An upper plenum wiper seal 172 constructed of two strips of flexible rubber or similar material, that are angled upwardly and inwardly toward each, is provided at the top of protection plenum 140 to allow a nominally closed slot through which a conveyor brackets 184 may slide. When a conveyor bracket 184 is not between upper plenum seal 172, the two strips contact against each other to block steam from exiting the plenum. While brackets 184 pass along seal 172 some small openings may occur. However, since a negative pressure relative to the outside environment is maintained, air will be pulled into protection plenum 140 to be evacuated with steam S through plenum ventilation duct 142. Likewise, a lower plenum seal 174 is provided just above hook 126 to seal the lower side of protection plenum 140 and to evacuate any steam that may escape from outer enclosure 118 and from steam chamber 114. Lower plenum seal 174 also includes two rubber strips (or similar material) that are angled upwardly to meet at their uppermost ends and to provide a nominally closed slot through which bracket 184 may slide.

Figure 11A:
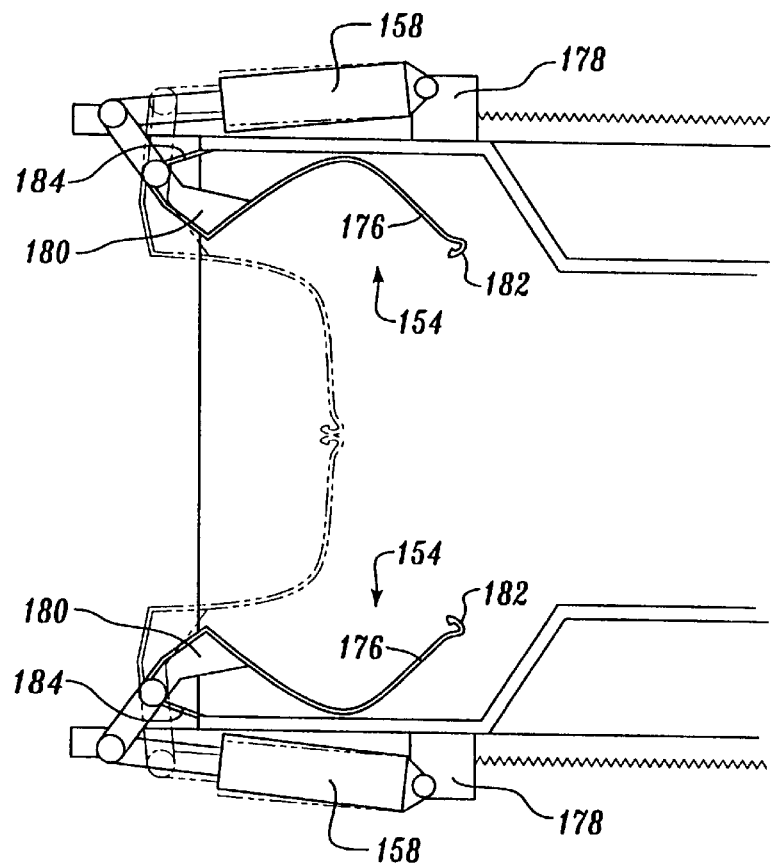
FIG. 11A is an enlarged, fragmentary top view showing the entrance door.
Figure 11B:
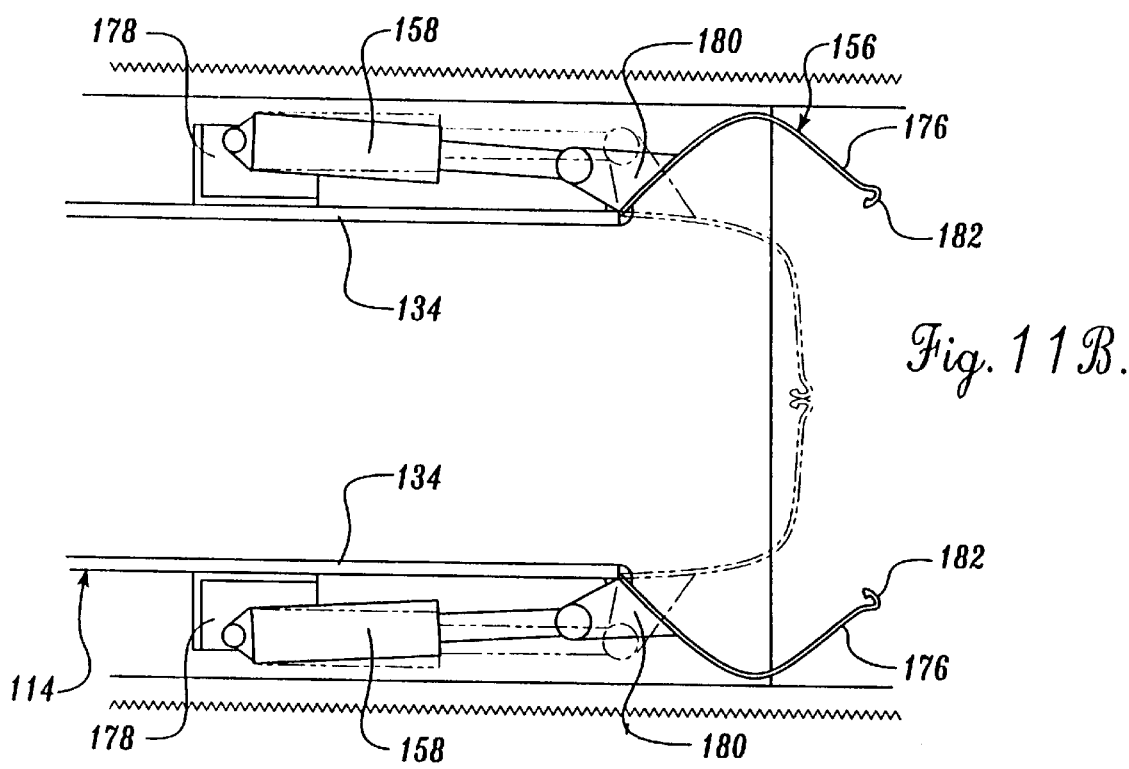
FIG. 11B is an enlarged, fragmentary top view showing the exit door.

FIGS. 11A and B illustrate the details of exit door 156 (FIG. 11B) and entrance door 154 (FIG. 11A). Exit door 156 includes door arms (halves) 176 that are pivotally attached to side walls 134 for sealing closure therewith. Actuator brackets 178 are secured to the outsides of side walls 134 and include a pivotal attachment to door actuators 158. The opposite end of door actuators 158 are secured to door brackets 180. Thus, retraction of actuator 158 causes door 156 to open while extension of actuators 158 causes door 156 to close. Door 156 includes door arms 176, each attached to a door bracket 180. The free ends of door arms 176 include hook-shaped door seals 182 that may be compressed one to another to provide an effective seal in the middle of door 156. The curved shape of door arms 176, with their connection to actuators 158, allows doors 156 to be opened and closed with minimal movement and space requirements outwardly from inner walls 134. Also, door 156 will open automatically when pushed by meat M.

Entrance doors 154 are somewhat similarly constructed. However, entrance doors 154 include actuators 158 attached to brackets fixed to outwardly extended portions of side walls 134. Side walls 134 flare outwardly near the upstream end of chamber 114 after which they extend in approximately parallel planes to the upstream end of chamber 114. This wider region of side walls 134 is necessary to accommodate the opening of door 154 inside of side walls 134. The pivot point of door arms 176 are at the upstream end of side walls 134. Supports 184 are provided to serve as a pivot for bracket 180 of door arms 176.

Another preferred alternate embodiment of the invention is provided and will be described in connection with FIG. 12. In this embodiment removal of excess surface liquid from the meat M, the application of steam to the meat, and cooling, is all carried out within moveable chamber 214. Except for the elements described below, the aspects of this embodiment are similar to those described above with respect to FIGS. 5–11. For example, an outer enclosure 218, similar to enclosure 118 is provided along with a conveyor 220 and track 222. A protection plenum 240, similar to protection plenum 140 is also provided as well as a plenum duct 242, a steam supply header 236 and a steam ventilation duct 238.

Figure 12:
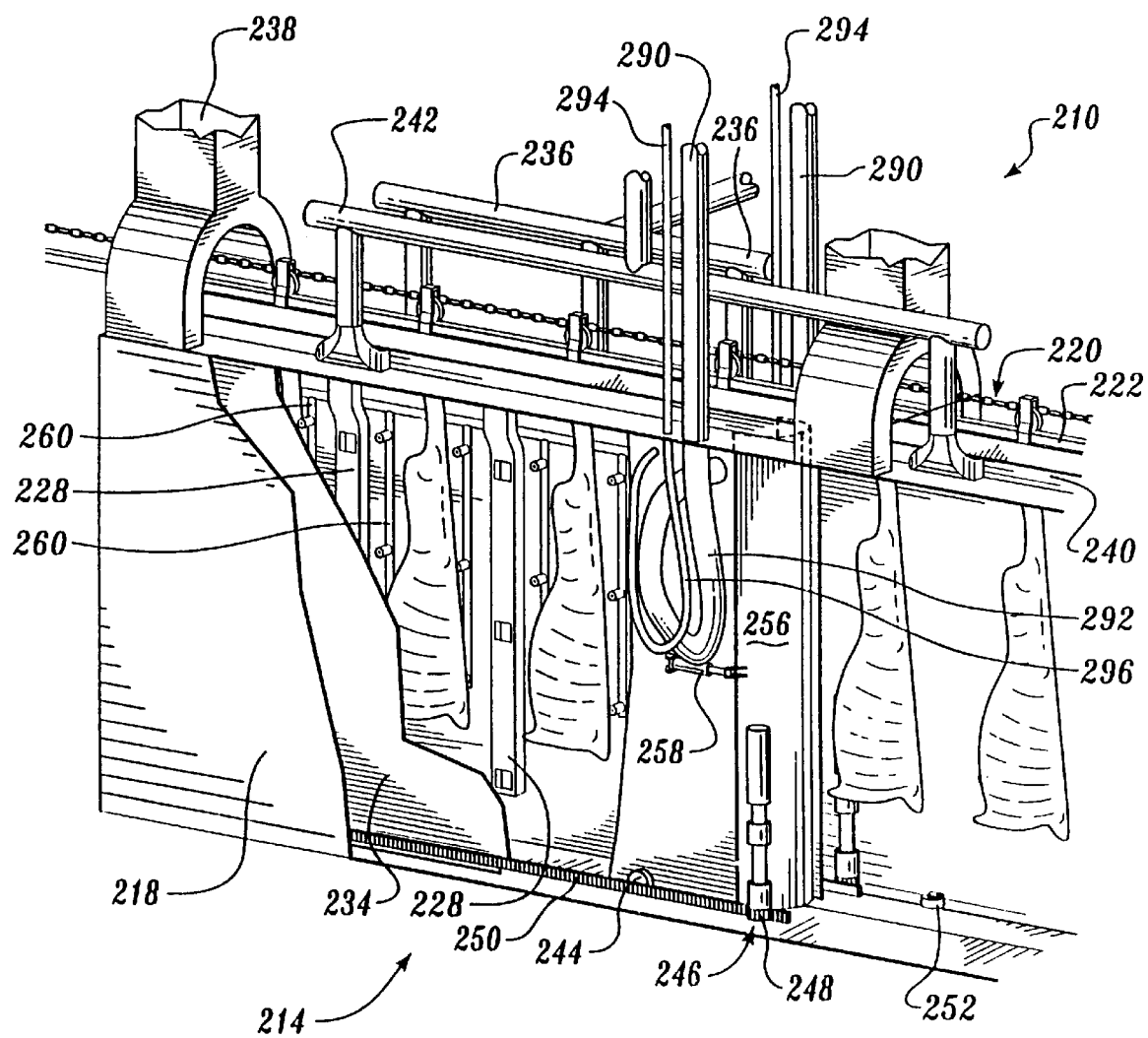
FIG. 12 is an isometric view of an alternate preferred processor including dewatering, steaming, and cooling structures with a moving chamber; and, FIG. 13 is a schematic view of a system for generating and supplying steam to the steam chambers of the present invention.

However, in the embodiment of the present invention show in FIG. 12, in order to carry out all steps within chamber 214, air banks 228 and chilled water banks 260 are secured to the inside of side walls 234 of chamber 214. Air banks 228 are illustrated as extending in columns down both of the insides of side walls 234. Air banks 228 include openings for blowing a coolant fluid, such as air, at the surface of meat M to remove excess surface liquid. The excess liquid is removed before steam is applied to the surface of meat M within chamber 214 as meat M moves along conveyor 220. Air banks 228 are connected to air supply lines 290 which extend to within the top of enclosure 218. Air supply lines 290 are coupled to flexible air hoses 292 that extend within chamber 214 to be connected to air banks 228. Flexible air hoses 292 are used with extra length to enable movement of chamber 214, while maintaining a constant connection with fixed air supply lines 290. The fluid for removing excess liquid from meat M may be obtained from fluid supply tanks or simply from ambient air.

Similarly, chilled water banks 260 are connected to flexible coolant hoses 296 that run to coolant supply lines 294. Again, the flexibility of flexible coolant hoses 296 allow chamber 214 to move relative to coolant supply lines 294 while still maintaining a constant supply of coolant fluid for cooling meat M within chamber 214 as meat M moves along conveyor 220.

The process of this alternate embodiment begins with meat M entering into entrance door 254 (not shown). Meat M continues to move as four or other number units (or carcasses) of meat M are enclosed within chamber 214. During this time air banks 228 blow air at the surfaces of meat M to remove any significant amounts of standing liquid, such as water, from the surfaces. Once doors 254 and 256 are closed, and the meat surfaces are sufficiently free from standing water, steam supply header 236 fills chamber 214 with steam for a sufficient amount of time and at such a temperature and pressure to destroy any surface pathogens, as described above in connection with previous embodiments. During this time, chamber 214 continues to move along with meat M on conveyor 220. Steam is then evacuated from chamber 214 with steam ventilation ducts 238 and chilled water banks 260 spray the surface of meat M to cool meat M and prevent any cooking of the meat. Chamber 214 is then be retracted to enclose additional meat to repeat the same process.

Figure 13:
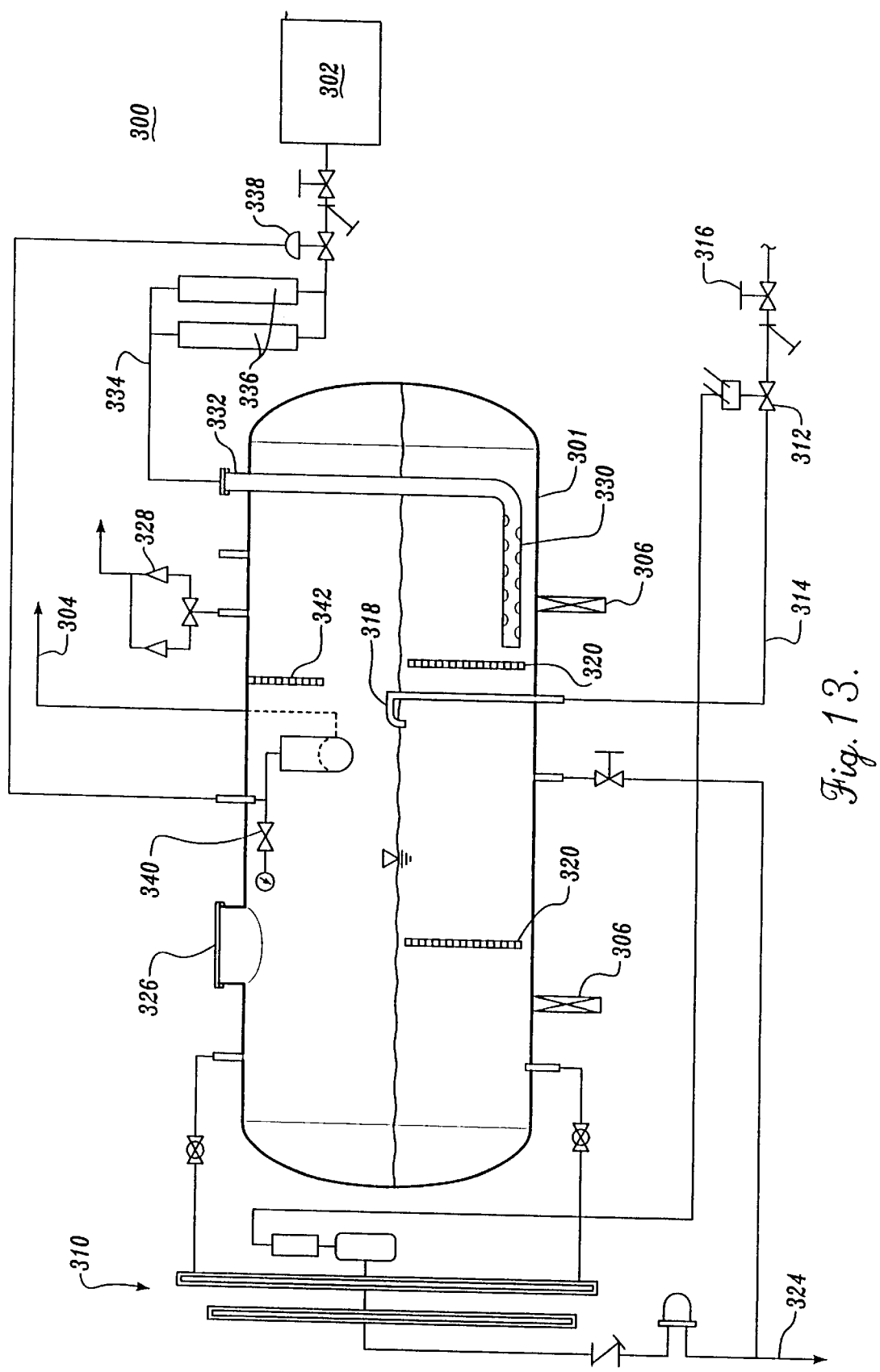

FIG. 13 illustrates applicants' unique system 300 for supplying steam to the steam chambers 14, 114 and 214 in sufficient quality and volume to very quickly purge and fill the steam chambers so that the meat M may be effectively and efficiently treated with the steam to destroy pathogens on the meat. To this end, the steam supply system 300 of the present invention includes a horizontally, elongate steam generation and storage vessel or tank 301 receiving steam from a boiler 302 or other steam source and supplying relatively large volumes of relatively low pressure steam to the steam chambers 14, 114 and 214 through outlet line 304.

To discuss the construction and operation of the steam supply system 300 in more detail, the vessel 301 is supported by spaced apart legs 306 in a standard manner. The vessel 301 is approximately half filled with water as indicated by 308. The water is at a temperature of approximately from 110° Celsius to about 130° Celsius. The level of the water 308 in tank 300 is maintained by a water level control system 310 capable of sensing the water level in the tank and controlling valve 312 operably disposed in water supply line 314. Ideally, a manual shutoff valve 316 is also disposed in water supply line 314 upstream of valve 312. The makeup water is introduced into vessel 301 through an inlet 318 located at an elevation somewhat below the top of the water line. A pair of transverse baffles 320 are mounted within the interior of the vessel 301 to restrict the shifting of the water 308 longitudinally within the vessel 301 during, for instance, introduction of supply steam into the tank, as discussed more fully below. In a preferred embodiment of the present invention, the baffles are approximately 50% open.

The vessel 301 is fitted with an outlet valve 322 connected in fluid flow communication to the drain 324. The valve 322 may be used to flush the vessel 301. Also, an inspection manway 326 is built into the top of the tank 301 to allow personnel entrance into the interior of the tank.

The vessel further includes a relief valve system 328 to relieve the pressure of the steam within the vessel if necessary. During operation, the steam produced by the supply system of the present invention exits the vessel 301 at about 21 psia to about 50 psia. Of course, the pressure of the steam exiting the vessel may have to be altered depending on various factors, including the pressure drop experienced in the steam between vessel 301 and the steam chambers 14, 114 and 214, as well as the desired volumetric flow rate of the steam supplied at the steam chambers. In one embodiment, vessel 301 ideally is constructed from stainless steel at an ASME/CSA rating of 60 pounds/300 cubic feet steam service. The relief valve system 328 is used to make sure that the pressure of the steam within the vessel 301 does not exceed safe limits.

Saturated dry steam at from approximately 60 to 100 psia and at about from 144 to 164 degrees Celsius is supplied to vessel 301 through an inlet pipe 330 having an exterior nipple 332 connected to supply line 334 receiving this charging steam from a boiler 302 or other type of steam supply. Filters 336 are interposed in supply line 334 to filter out impurities therein. The pressure of the steam within the supply line 334 is controlled by a pressure control valve 338.

It is to be appreciated that the water in vessel 301 may be heated other than by use of charging steam. For instance, the water could be heated directly by an electrically or gas fueled heater or by steam heating coils.

Steam from vessel 301 is directed to the steam chambers 14, 114 and 214 through an outlet line 304 located at an upper central portion of the vessel. A monitoring system 340 monitors the temperature and pressure of the steam exiting the vessel 301 through line 304, which monitoring system is operably connected to valve 338 in the steam supply line 334. A steam baffle 342 is transversely located in the upper elevator of the vessel 301 to enhance the mixing of the steam within the vessel.

It will be appreciated that in the steam supply system of the present invention, the water 308 stored within the vessel 301 serves as a heat energy reservoir capable of being utilized to very rapidly generate relatively large volumes of steam. This is important in that to flush the steam treatment chambers 14, 114 and 214, steam at a volume of approximately three to four times the volume of the steam chambers is required to be introduced into the steam chambers very rapidly. Essentially, large charges of steam are instantaneously required by the steam treatment chambers 14, 114 and 214. The steam supply system of the present invention is capable of supplying such relatively large volumes of steam. To this end, ideally the volume of water in vessel 301 is about from $1/10$ to $1/5$ of the volume of the steam treatment chambers. Also, ideally the water in the vessel 301 occupies about from $1/3$ to $2/3$ of the volume of the vessel.

It will be appreciated that if steam were supplied to the steam treatment chambers 14, 114 and 214 from a storage vessel of pure steam, such storage vessel would have to be significantly larger in size than vessel 301 to be able to supply the steam at a rate fast enough to purge the steam treatment chambers and fill the chambers with treatment steam at a pace required by the present invention. If the steam were pressurized in an attempt to reduce the volume of such steam storage vessel, it is possible that the pressurized steam could cause hot spots and other damage to the meat being treated within the treatment chambers 14, 114 and 214. However, through the present invention, applicants are able to supply large volumes of relatively low pressure steam to the steam treatment chambers 14, 114 and 214.

While the preferred embodiments of the invention has been illustrated and described, it will be appreciated that various changes can be made therein without departing from the spirit and scope of the invention.

The embodiments of the invention in which an exclusive property or privilege is claimed are defined as follows:

1. An apparatus for cleaning meat comprising:
   (a) means for rapidly removing surface water from the meat;
   (b) a steam heating chamber including an enclosure and a steam supply to supply steam to within the enclosure to rapidly heat the exterior of the meat the steam being applied to the meat after the removing means has removed surface water from the meat; and
   (c) cooling means for rapidly chilling the surface meat heated by the steam.

2. The apparatus of claim 1, wherein the steam heating chamber enclosure maintains a positive pressure within the steam heating chamber relative to outside the steam heating chamber.

3. The apparatus of claim 2, wherein the steam chamber enclosure includes pressure-retaining entrance and exit doors to maintain the positive pressure in the steam chamber as meat enters and exits the steam chamber.

4. The apparatus of claim 1, wherein the steam heating chamber further comprises a floor having condensate collection means for collecting the condensate that is formed in the steam heating chamber.

5. The apparatus of claim 1, wherein the means for rapidly removing the surface water from the meat includes air nozzles to blow large volumes of air at the surface of the meat.

6. The apparatus of claim 5, further comprising a chamber surrounding the air nozzles.

7. The apparatus of claim 1, wherein the means for rapidly removing the surface water from the meat comprises a plurality of air banks holding the air nozzles to direct high velocity air at the surface of the meat.

8. The apparatus of claim 1, wherein the cooling means includes means for spraying chilled water at the surface of the meat.

9. The apparatus of claim 8, wherein the cooling means include a chilled water chamber enclosing the water spraying means.

10. The apparatus of claim 1, further comprising a conveyor for supporting the meat during travel through the steam chamber, and past the cooling means.

11. The apparatus of claim 1, wherein the steam supply comprising:
  (a) a storage vessel;
  (b) a water supply system for supplying water to the storage vessel and maintaining the water at a desired elevation range within the storage vessel;
  (c) means for heating the water in the storage to approximately from about 110° Celsius to 130° Celsius; and,
  (d) a transfer system in steam flow communication with the storage vessel at a location above the level of the water in the storage vessel and in communication with the steam heating chamber.

12. The steam supply according to claim 11, wherein the volume of water within the storage vessel is approximately from 1/10 to 1/5 times the volume of the steam heating chamber.

13. The steam supply according to claim 12, wherein the volume of water within the storage vessel is approximately about 1/3 to about 2/3 of the total volume of the storage vessel.

14. The apparatus of claim 11, wherein the water heating means includes charging steam introduced into the storage vessel at an elevation below the top of the water stored in the storage vessel, the charging steam being at a pressure of about 60 psia to 100 psia and at a temperature of about from 144° Celsius to about 164° Celsius.

15. An apparatus for destroying surface pathogens on meat, comprising:
  (a) a dewatering chamber having means for blowing a gas at the surface of the meat to quickly remove surface water from the meat;
  (b) a steam heating chamber disposed adjacent the dewatering chambers, the steam chamber including an enclosure that is sealed relative to the ambient;
  (c) a steam supply for supplying the steam heating chamber with steam, the steam being applied to the meat after the blowing means have removed the surface water from the meat; and
  (d) a cooling chamber disposed adjacent the steam heating chamber, the cooling chamber having means for spraying chilled liquid onto the surface of the meat for rapidly cooling the meat after it has passed through the steam heating chamber.

16. The apparatus of claim 15, further comprising a meat conveyor extending through the dewatering chamber, the steam chamber and the cooling chamber, the meat conveyor having means for supporting the meat.

17. The apparatus of claim 16, wherein the gas blown in the dewatering chamber is air, and wherein the chilled liquid used in the cooling chamber is water.

18. The apparatus according to claim 15, wherein the steam supply comprising:
  (a) a storage vessel;
  (b) a water supply system for supplying water to the storage vessel and maintaining a desired volume of water within the storage vessel to partially fill the vessel with water, the volume of water in the vessel being about 1/10 to about 1/5 the volume of the steam heating chamber;
  (c) means for heating the water in the storage vessel to from about 110° Celsius to about 130° Celsius and maintaining the pressure in the tank above the water level at from about 21 psia to about 40 psia; and,
  (d) a transfer system for transferring steam from the storage vessel to the steam heating chamber, the transfer system being disposed in steam flow communication with the storage vessel at an elevation above the water within the storage vessel.

19. The apparatus according to claim 18, wherein the means for heating the water within the storage comprises charging steam introduced into the storage vessel at an elevation below the top of the water stored in the storage vessel, the charging steam introduced into the storage vessel at a pressure of about 60 psia to about 100 psia and at a temperature of from about 144° Celsius to about 164° Celsius.

20. The apparatus according to claim 18, wherein the volume of water within the storage vessel is approximately from 33% to 67% of the total volume of the storage vessel.

21. An apparatus for destroying surface pathogens on meat, comprising:
  (a) a chamber for receiving and at least partially enclosing the meat;
  (b) a means for removing surface liquid from the meat within said chamber;
  (c) supply of steam available within said chamber for applying steam to the surface of the meat to rapidly heat the surface of the meat; and
  (d) a means for rapidly cooling the surface of the meat within said chamber.

22. The apparatus of claim 21, wherein the meat is attached to a conveyor to move along with the conveyor, the apparatus further comprising a stationary frame coupled to said chamber, said chamber being moveable relative to said frame along the path of the conveyor to move with the meat.

23. The apparatus of claim 21, wherein said means for removing surface liquid from the meat includes a fluid supply and lines attached to and extending within chamber to blow fluid at said meat within said chamber.

24. The apparatus of claim 21, wherein said means for cooling the meat includes a coolant fluid supply and coolant lines attached to and extending within said chamber to direct the coolant fluid at the meat.

25. The apparatus according to claim 21, further comprising a steam supply system for supplying steam to the chamber, comprising:

(a) a storage vessel;

(b) a water supply system for supplying make-up water to the storage vessel and maintaining the water at a desired elevational range within the storage vessel to partially fill the storage vessel with water;

(c) means for maintaining the temperature of the water in the storage vessel at about 110° Celsius to about 130° Celsius; and, (d) a routing system to route steam from the storage vessel to the chamber, the routing system in steam flow communication with the storage vessel at a level above the water in the storage vessel.

26. The apparatus of claim 25, wherein the means for maintaining the temperature of the water in the storage vessel comprises introducing charging steam into the storage vessel at an elevation below the top of the water stored in the storage vessel, the charging steam at a pressure of about 60 psia to 100 psia and at a temperature of about from 144° C. to about 164° C.

27. The steam supply system according to claim 25, wherein the volume of water within the storage vessel is approximately 33% to 66% of the total volume of the storage vessel.

28. The steam supply system according to claim 24, wherein the volume of water within the storage vessel is approximately from about 0.1 to about 0.2 times the volume of the chamber.

29. An apparatus for pasteurizing meat supported by a moving conveyor as the meat moves along with the conveyor, the apparatus comprising:

(a) a steam chamber sized to enclose at least one piece of the meat being supported by the conveyor, the steam chamber being moveable along a portion of the conveyor for movement within the conveyor, to heat the surface of the meat as the meat moves with the conveyor, the steam chamber having an upstream end and a downstream end;

(b) retraction means acting on the steam chamber for retracting the steam chamber along the conveyor, in a direction opposite to the direction of movement of the conveyor; and (c) cooling means for rapidly cooling the surface of the meat heated by the steam.

30. The apparatus of claim 29, further comprising a stationary enclosure surrounding the steam chamber.

31. The apparatus of claim 30, further comprising a vacuum source associated with the stationary enclosure to evacuate steam therefrom.

32. The apparatus of claim 29, wherein the steam chamber is synchronized with the conveyor to move with the conveyor while heating the surface of the meat.

33. The apparatus of claim 29, wherein the steam chamber includes an entrance closure attached thereto at the upstream end of the steam chamber and an exit closure attached thereto at the downstream end of the steam chamber.

34. The apparatus of claim 33, wherein the exit and entrance closures comprise curved panels with concave sides facing in an upstream direction relative to the direction of movement of the meat, the panels including actuators for opening and closing the steam chamber.

35. The apparatus of claim 29, wherein the cooling means comprise fluid jets.

36. The apparatus of claim 35, wherein the fluid jets comprise water jets.

37. The apparatus of claim 35, wherein the fluid jets comprise air jets.

38. The apparatus of claim 29, further comprising a steam supply system for supplying steam to the steam chamber, comprising:

(a) a storage vessel;

(b) a water supply system for supplying water to the storage vessel and maintaining the water at a desired elevation within the storage vessel;

(c) a water heating system for maintaining the temperature of the water in the storage vessel at about 110° Celsius to about 130° Celsius; and, (d) a delivery system in steam flow communication with the storage vessel at a location above the level of the water in the storage vessel and in communication with the steam chamber, the delivery system having valve means for controlling the flow of steam through the delivery system.

39. The apparatus according to claim 38, wherein the steam generated within the storage vessel upon exiting the storage vessel for supply to the steam chamber is at a temperature of from about 110° Celsius to about 130° Celsius and other pressure of from about 21 psia to about 40 psia.

40. The apparatus according to claim 38, wherein the volume of water within the storage vessel is approximately from about 0.1 to about 0.2 times the volume of the steam chamber.

41. The apparatus according to claim 40, wherein the volume of the water within the storage vessel is approximately from about 33% to about 67% of the total volume of the storage vessel.

42. The water heating system of claim 38, wherein the water heating system comprises means for introducing charging steam into the storage vessel at an elevation below the top of the water stored in the storage vessel, the charging steam being at a pressure of about 60 psia to 100 psia and at a temperature of about from 144° Celsius to about 164° Celsius.

43. The apparatus of claim 29, further comprising means for dewatering the meat prior to the meat being heated by the steam.

* * * * *

UNITED STATES PATENT AND TRADEMARK OFFICE
CERTIFICATE OF CORRECTION

PATENT NO. : 5,976,005   Page 1 of 4
DATED : November 2, 1999
INVENTOR(S) : R.C. Wilson et al.

It is certified that error appears in the above-identified patent and that said Letters Patent is hereby corrected as shown below:

| COLUMN | LINE | |
|---|---|---|
| 1 | 19 | "*E-coli*" should read --*E. coli*-- |
| 1 | 27 | "*E-coli*" should read --*E. coli*-- |
| 2 | 49 | after "(e.g." insert --,-- |
| 3 | 23 | "subject" should read --subjected-- |
| 4 | 4 | after "may be" delete "both" |
| 4 | 61 | after "door;" delete "and" |
| 4 | 64 | "with" should read --within-- |
| 5 | 6 | "*E-coli*" should read --*E. coli*-- |
| 5 | 61 | "stream" should read --steam-- |
| 6 | 2 | "stream" should read --steam-- |
| 6 | 43 | "FIG. 3. And" should read --FIG. 3, and--- |
| 7 | 43 | "fetal" should read --fecal-- |
| 9 | 44 | after "Meat M" delete "," |

UNITED STATES PATENT AND TRADEMARK OFFICE
CERTIFICATE OF CORRECTION

PATENT NO.   : 5,976,005                                  Page 2 of 4
DATED        : November 2, 1999
INVENTOR(S)  : R.C. Wilson et al.

It is certified that error appears in the above-identified patent and that said Letters Patent is hereby corrected as shown below:

| COLUMN | LINE | |
|---|---|---|
| 10 | 19 | after "treated" delete "," |
| 10 | 25 | "water, perhaps" should read --water and perhaps-- |
| 11 | 34 | "meet within" should read --meet with-- |
| 11 | 35 | "forms" should read --form-- |
| 11 | 45 | after "rubber" insert --,-- |
| 11 | 48 | "a conveyor brackets" should read --conveyor brackets-- |
| 11 | 49 | "between upper plenum seal" should read --between the upper plenum seals-- |
| 12 | 4 | "opposite end" should read --opposite ends-- |
| 12 | 5 | "actuator 158" should read --actuators 158-- |
| 12 | 13 | "dosed" should read --closed-- |
| 12 | 41 | "show in" should read --shown in-- |
| 12 | 61 | "allow" should read --allows-- |

UNITED STATES PATENT AND TRADEMARK OFFICE
CERTIFICATE OF CORRECTION

| | | |
|---|---|---|
| PATENT NO. : | 5,976,005 | Page 3 of 4 |
| DATED : | November 2, 1999 | |
| INVENTOR(S) : | R.C. Wilson et al. | |

It is certified that error appears in the above-identified patent and that said Letters Patent is hereby corrected as shown below:

| COLUMN | LINE | |
|---|---|---|
| 13 | 16 | after "is then" delete --be-- |
| 13 | 31-32 | delete "as indicated by" |
| 14 | 53 | "has" should read --have-- |
| 14 (Claim 1, | 63 line 6) | after "the meat" insert --,-- |
| 14 (Claim 1, | 66 line 9) | after "chilling the surface" insert --of the-- |
| 15 (Claim 11, | 38 line 7) | after "storage" insert --vessel-- |
| 16 (Claim 19, | 34 line 2) | after "storage" insert --vessel-- |
| 16 (Claim 21, | 50 line 7) | before "supply" insert --a-- |
| 16 (Claim 23, | 62 line 3) | after "extending within" insert --said-- |

UNITED STATES PATENT AND TRADEMARK OFFICE
CERTIFICATE OF CORRECTION

PATENT NO. :  5,976,005  Page 4 of 4
DATED      :  November 2, 1999
INVENTOR(S) : R.C. Wilson et al.

It is certified that error appears in the above-identified patent and that said Letters Patent is hereby corrected as shown below:

| COLUMN | LINE | |
|---|---|---|
| 17 | 38 | "movement within" should read |
| (Claim 29, | line 7) | --movement with-- |

Signed and Sealed this

Twentieth Day of March, 2001

Attest:

NICHOLAS P. GODICI

Attesting Officer    Acting Director of the United States Patent and Trademark Office